United States Patent
Derenne et al.

(10) Patent No.: US 10,905,612 B2
(45) Date of Patent: Feb. 2, 2021

(54) SYSTEMS AND METHODS FOR FACILITATING MOVEMENT OF A PATIENT TRANSPORT APPARATUS

(71) Applicant: Stryker Corporation, Kalamazoo, MI (US)

(72) Inventors: Richard A. Derenne, Portage, MI (US); Bjorn James Gunderson, Chicago, IL (US); Stephen Frederick Peters, Hickory Corners, MI (US); Corry Steven Daus, Libertyville, IL (US); Darcy Richard Wank, Richland, MI (US); Kevin M. Patmore, Plainwell, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 16/711,850

(22) Filed: Dec. 12, 2019

(65) Prior Publication Data
US 2020/0138655 A1    May 7, 2020

Related U.S. Application Data

(62) Division of application No. 15/336,068, filed on Oct. 27, 2016, now Pat. No. 10,568,792.
(Continued)

(51) Int. Cl.
*A61G 7/08* (2006.01)
*A61G 1/02* (2006.01)
(Continued)

(52) U.S. Cl.
CPC .............. *A61G 7/08* (2013.01); *A61G 1/0243* (2013.01); *A61G 1/0275* (2013.01);
(Continued)

(58) Field of Classification Search
CPC .. A61G 1/0275; A61G 1/0281; A61G 1/0287; A61G 7/0506; A61G 33/006;
(Continued)

(56) References Cited

U.S. PATENT DOCUMENTS

| 2,583,858 A | 1/1952 | Kostolecki |
| 2,925,887 A | 2/1960 | Gibson |

(Continued)

FOREIGN PATENT DOCUMENTS

| AU | 2008258348 A1 | 12/2008 |
| CA | 2010543 A1 | 9/1990 |

(Continued)

OTHER PUBLICATIONS

Caster concepts: How swivel lead impacts caster performance, May 22, 2014.
(Continued)

*Primary Examiner* — Kevin Hurley
*Assistant Examiner* — Marlon A Arce
(74) *Attorney, Agent, or Firm* — Howard & Howard Attorneys PLLC

(57) ABSTRACT

Systems and methods for facilitating movement of a patient transport apparatus. The patient transport apparatus has a support structure and a patient support surface. Caster assemblies are coupled to the support structure to roll about a roll axis and swivel about a swivel axis. A control system is configured to control brake mechanisms, steer-lock mechanisms, and pre-swivel mechanisms of the caster assemblies based on one or more inputs.

20 Claims, 15 Drawing Sheets

Related U.S. Application Data

(60) Provisional application No. 62/247,396, filed on Oct. 28, 2015.

(51) Int. Cl.
| | |
|---|---|
| *A61G 5/10* | (2006.01) |
| *A61G 7/05* | (2006.01) |
| *B60B 33/00* | (2006.01) |
| *B60B 33/02* | (2006.01) |

(52) U.S. Cl.
CPC ......... *A61G 1/0281* (2013.01); *A61G 1/0287* (2013.01); *A61G 5/1051* (2016.11); *A61G 7/0506* (2013.01); *A61G 7/0524* (2016.11); *A61G 7/0528* (2016.11); *B60B 33/006* (2013.01); *B60B 33/0086* (2013.01); *B60B 33/0092* (2013.01); *B60B 33/026* (2013.01); *A61G 2203/16* (2013.01); *A61G 2203/32* (2013.01); *A61G 2203/34* (2013.01); *A61G 2203/36* (2013.01); *A61G 2203/38* (2013.01); *A61G 2203/40* (2013.01); *B60B 2200/242* (2013.01)

(58) Field of Classification Search
CPC ............ A61G 2203/16; A61G 2203/32; A61G 2203/34; A61G 2203/36; A61G 2203/38; A61G 2203/40; A61G 7/08; A61G 7/0524; A61G 5/1051; A61G 7/0528; A61G 1/024; B60B 33/0086; B60B 33/0092; B60B 33/026
See application file for complete search history.

(56) References Cited

U.S. PATENT DOCUMENTS

| | | | |
|---|---|---|---|
| 3,276,788 A | 10/1966 | Sackler et al. | |
| 3,349,862 A | 10/1967 | Shirey, Jr. | |
| 4,163,929 A | 8/1979 | Janu et al. | |
| 4,280,246 A | 7/1981 | Christensen | |
| 4,805,712 A | 2/1989 | Singleton | |
| 4,819,925 A | 4/1989 | Linnemann et al. | |
| 4,895,173 A | 1/1990 | Brault et al. | |
| 5,133,106 A | 7/1992 | Milbredt et al. | |
| 5,517,718 A | 5/1996 | Eichhorn | |
| 5,547,038 A | 8/1996 | Madwed | |
| 5,609,220 A | 3/1997 | Moriya et al. | |
| 5,921,338 A | 7/1999 | Edmondson | |
| 5,927,423 A | 7/1999 | Wada et al. | |
| 6,109,379 A | 8/2000 | Madwed | |
| 6,321,878 B1 | 11/2001 | Mobley et al. | |
| 6,330,926 B1 | 12/2001 | Heimbrock et al. | |
| 6,459,962 B2 | 10/2002 | Ulrich et al. | |
| 6,584,641 B1 | 7/2003 | Milbredt | |
| 6,588,523 B2 | 7/2003 | Heimbrock et al. | |
| 6,752,224 B2 | 6/2004 | Hopper et al. | |
| 6,834,402 B2 | 12/2004 | Hanson et al. | |
| 6,845,533 B1 | 1/2005 | Tulette | |
| 6,902,019 B2 | 6/2005 | Heimbrock et al. | |
| 7,273,115 B2 | 9/2007 | Kummer et al. | |
| 7,284,626 B2 | 10/2007 | Heimbrock et al. | |
| 7,302,717 B2 | 12/2007 | Reinke et al. | |
| 7,398,571 B2 | 7/2008 | Souke et al. | |
| 7,406,745 B2 | 8/2008 | Chou | |
| 7,407,024 B2 | 8/2008 | Vogel et al. | |
| 7,481,286 B2 | 1/2009 | Ruschke et al. | |
| 7,617,890 B2 | 11/2009 | Romig | |
| 7,644,458 B2 | 1/2010 | Foster et al. | |
| 7,698,765 B2 | 4/2010 | Bobey et al. | |
| 7,789,175 B2 | 9/2010 | Tobey et al. | |
| 7,828,092 B2 | 11/2010 | Vogel et al. | |
| 7,950,108 B2 | 5/2011 | Yang et al. | |
| 7,953,537 B2 | 5/2011 | Bhai | |
| 8,051,533 B2 | 11/2011 | Block et al. | |
| 8,056,162 B2 | 11/2011 | Newkirk et al. | |
| 8,125,318 B2 | 2/2012 | Heimbrock et al. | |
| 8,196,944 B1 | 6/2012 | Vondrak | |
| 8,205,297 B2 | 6/2012 | Fallshaw et al. | |
| 8,266,742 B2 | 9/2012 | Andrienko | |
| 8,267,205 B2 | 9/2012 | Ishii et al. | |
| 8,334,779 B2 | 12/2012 | Zerhusen et al. | |
| 8,442,738 B2 | 5/2013 | Patmore | |
| 8,484,802 B1 | 7/2013 | Lin et al. | |
| 8,720,616 B2 | 5/2014 | Kofoed et al. | |
| 8,776,314 B2 | 7/2014 | Hofrichter et al. | |
| 8,838,311 B2 * | 9/2014 | Koike .................. | B62D 11/003 701/22 |
| 8,984,685 B2 | 3/2015 | Robertson et al. | |
| 9,108,665 B2 | 8/2015 | Amino et al. | |
| 9,205,009 B2 | 12/2015 | Koors et al. | |
| 9,220,651 B2 | 12/2015 | Hyde et al. | |
| 9,259,369 B2 | 2/2016 | Derenne et al. | |
| 9,320,444 B2 | 4/2016 | Hayes et al. | |
| 9,833,366 B2 | 12/2017 | DeLuca et al. | |
| 10,004,651 B2 | 6/2018 | DeLuca et al. | |
| 10,568,792 B2 | 2/2020 | Derenne et al. | |
| 2002/0043411 A1 | 4/2002 | Heimbrock et al. | |
| 2003/0009825 A1 | 1/2003 | Gallant et al. | |
| 2003/0159861 A1 | 8/2003 | Hopper et al. | |
| 2003/0183427 A1 | 10/2003 | Tojo et al. | |
| 2003/0184071 A1 | 10/2003 | Tokumaru | |
| 2005/0236208 A1 | 10/2005 | Runkles et al. | |
| 2006/0102392 A1 | 5/2006 | Johnson et al. | |
| 2006/0231302 A1 | 10/2006 | Rose | |
| 2007/0284845 A1 | 12/2007 | Roovers et al. | |
| 2008/0084175 A1 | 4/2008 | Hollis | |
| 2008/0141459 A1 | 6/2008 | Hamberg et al. | |
| 2008/0238072 A1 | 10/2008 | Kofoed et al. | |
| 2009/0000839 A1 * | 1/2009 | Ishii ...................... | A01D 34/43 180/65.51 |
| 2009/0001740 A1 | 1/2009 | Kofoed et al. | |
| 2009/0038864 A1 | 2/2009 | Yun | |
| 2009/0143703 A1 | 6/2009 | Dixon et al. | |
| 2009/0153370 A1 | 6/2009 | Cooper et al. | |
| 2011/0087416 A1 | 4/2011 | Patmore | |
| 2012/0117730 A1 | 5/2012 | Lemire et al. | |
| 2012/0283746 A1 | 11/2012 | Hu et al. | |
| 2013/0008732 A1 | 1/2013 | Richter | |
| 2014/0076644 A1 * | 3/2014 | Derenne ............... | A61G 1/0275 180/19.2 |
| 2014/0109342 A1 | 4/2014 | Hofrichter et al. | |
| 2014/0150806 A1 | 6/2014 | Hu et al. | |
| 2014/0238784 A1 | 8/2014 | Yeo | |
| 2014/0265502 A1 | 9/2014 | Hough et al. | |
| 2014/0324315 A1 | 10/2014 | Brondum | |
| 2015/0266342 A1 | 9/2015 | Howard et al. | |
| 2016/0137216 A1 | 5/2016 | Nilsson et al. | |

FOREIGN PATENT DOCUMENTS

| | | |
|---|---|---|
| CN | 2915071 Y | 6/2007 |
| CN | 200960241 Y | 10/2007 |
| DE | 4319516 A1 | 12/1994 |
| DE | 19949351 A1 | 7/2001 |
| EP | 0329504 A1 | 8/1989 |
| EP | 0352647 A2 | 1/1990 |
| EP | 0403202 A2 | 12/1990 |
| EP | 0653341 A1 | 5/1995 |
| EP | 0707842 A1 | 4/1996 |
| EP | 0630637 B1 | 12/1998 |
| EP | 2208487 A2 | 7/2010 |
| EP | 2248500 A2 | 11/2010 |
| JP | H0924071 | 1/1997 |
| JP | H10181609 | 7/1998 |
| JP | H10305705 | 11/1998 |
| JP | 2000016298 A | 1/2000 |
| JP | 2000118407 A | 4/2000 |
| JP | 2004321722 A | 11/2004 |
| JP | 2005344777 A | 12/2005 |
| JP | 2008168871 A | 7/2008 |
| JP | 2014212844 A | 11/2014 |
| KR | 20030028351 A | 4/2003 |
| WO | 8707830 A1 | 12/1987 |

(56) References Cited

FOREIGN PATENT DOCUMENTS

| WO | 9421505 | A1 | 9/1994 |
|---|---|---|---|
| WO | 9520514 | A1 | 8/1995 |
| WO | 9607555 | A1 | 3/1996 |
| WO | 9633900 | A1 | 10/1996 |
| WO | 0185084 | A1 | 11/2001 |
| WO | 2005041837 | A2 | 5/2005 |
| WO | 2005105480 | A1 | 11/2005 |
| WO | 2007016559 | A2 | 2/2007 |
| WO | 2008148169 | A1 | 12/2008 |
| WO | 2009113009 | A1 | 9/2009 |
| WO | 2012055407 | A1 | 5/2012 |
| WO | 2014059483 | A1 | 4/2014 |
| WO | 2014075679 | A1 | 5/2014 |

OTHER PUBLICATIONS

English language abstract and machine-assisted English translation for EP 2 248 500 extracted from espacenet.com database on Jul. 29, 2019, 17 pages.
English language abstract and machine-assisted translation for CN200960241 extracted from espacenet.com database Feb. 14, 2018, 12 pages.
English language abstract and machine-assisted translation for CN2915071 extracted from espacenet.com database Feb. 13, 2018, 9 pages.
English language abstract and machine-assisted translation for DE19949351 extracted from espacenet.com database Feb. 14, 2017, 22 pages.
English language abstract and machine-assisted translation for DE4319516 extracted from espacenet.com database Feb. 14, 2017, 16 pages.
English language abstract and machine-assisted translation for EP0329504 extracted from espacenet.com database Feb. 14, 2017, 24 pages.
English language abstract and machine-assisted translation for EP0352647 extracted from espacenet.com database Feb. 14, 2017, 9 pages.
English language abstract and machine-assisted translation for EP0630637 extracted from espacenet.com database Feb. 14, 2018, 24 pages.
English language abstract and machine-assisted translation for EP0630637 extracted from espacenet.com database on Mar. 25, 2017, 22 pages.
English language abstract and machine-assisted translation for JP2000016298 extracted from espacenet.com database Feb. 14, 2017, 12 pages.
English language abstract and machine-assisted translation for JP2005344777 extracted from espacenet.com database Feb. 14, 2018, 17 pages.
English language abstract and machine-assisted translation for JP2014212844 extracted from espacenet.com database Feb. 14, 2017, 22 pages.
English language abstract and machine-assisted translation for JPH0924071 extracted from espacenet.com database Feb. 14, 2017, 23 pages.
English language abstract and machine-assisted translation for JPH10181609 extracted from espacenet.com database Feb. 14, 2017, 18 pages.
English language abstract and machine-assisted translation for JPH10305705 extracted from espacenet.com database Feb. 14, 2017, 19 pages.
English language abstract and machine-assisted translation for JPH2000118407 extracted from espacenet.com database Feb. 14, 2017, 12 pages.
English language abstract and machine-assisted translation for JPH2004321722 extracted from espacenet.com database Feb. 14, 2017, 17 pages.
English language abstract and machine-assisted translation for KR20030028351 extracted from espacenet.com database Feb. 14, 2017, 7 pages.
European Search Report and Written Opinion dated Apr. 14, 2016, for European patent application EP 13839462, corresponding to U.S. Appl. No. 13/795,193, the parent of U.S. Appl. No. 15/004,501.
Fallshaw Wheels & Castors, Safety Made Simple, Trinity Ebc Brochure, 4 pages, Sunshine VIC Australia.
Fallshaw, Trinity EBC,URL: https://www.fallshaw.com.au/castors/specialised/trinity-ebc.
International Search Report for PCT/US2013/056595, the International counterpart to U.S. Appl. No. 13/795,193.
International Written Opinion for PCT/US2013/056595, the International counterpart to U.S. Appl. No. 13/795,193.
U.S. Appl. No. 15/809,350. Application not provided as it has not yet published and therefore unavailable for viewing to the public.
VersaCare Bed Service Manual from Hill-Rom, MAN333, Rev2.
English language abstract and machine-assisted translation for JP 2008-168871 extracted from espacenet.com database on Jul. 22, 2020, 27 pages.

* cited by examiner

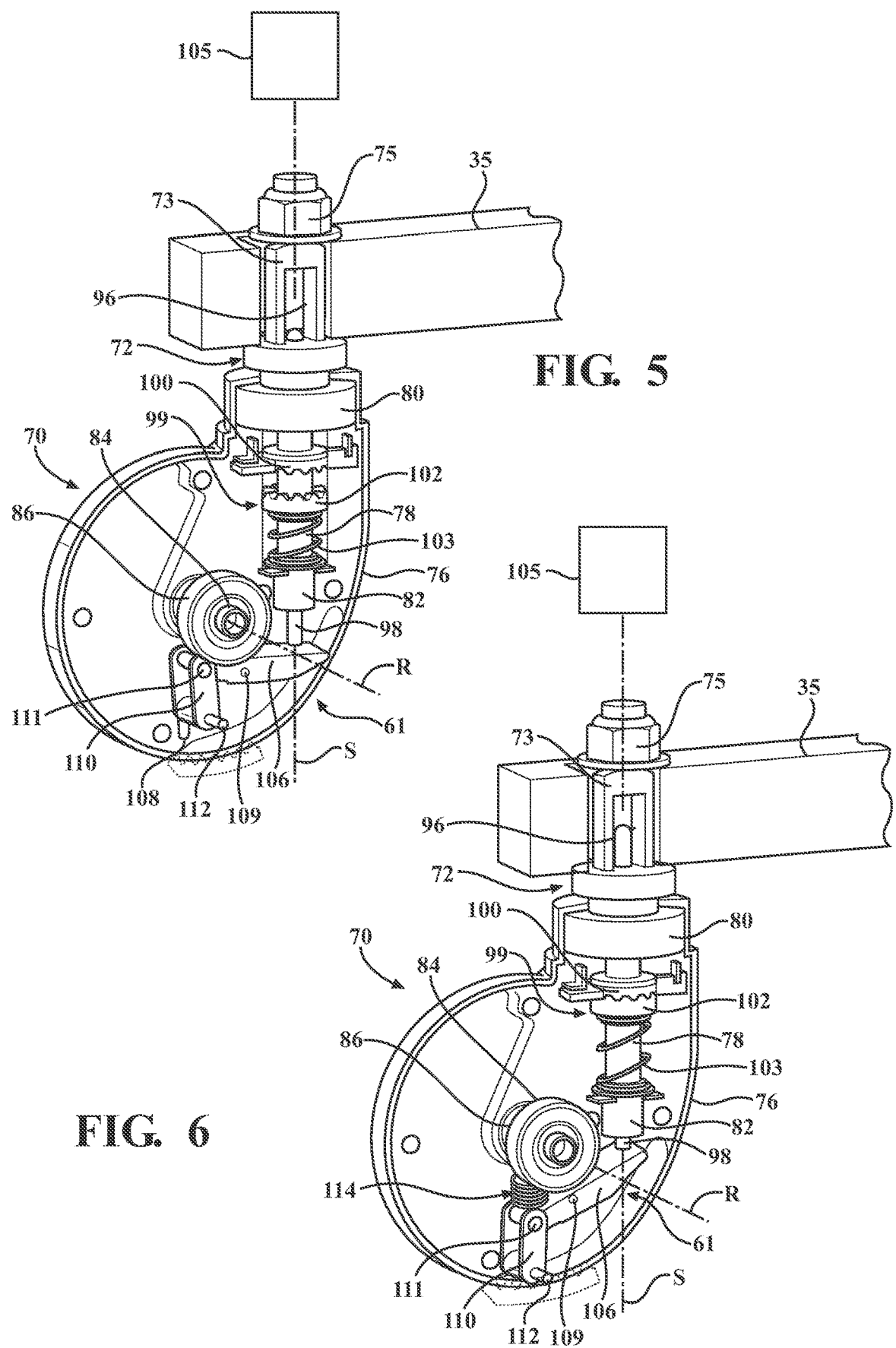

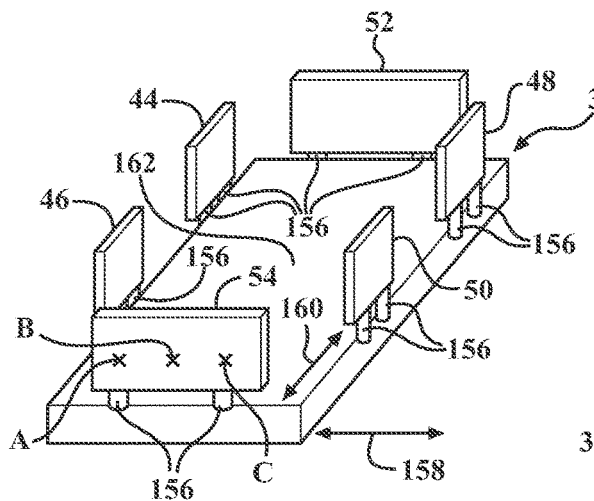
FIG. 15
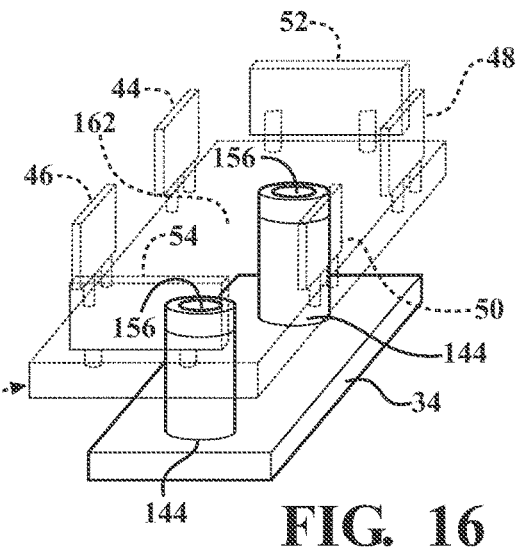
FIG. 16
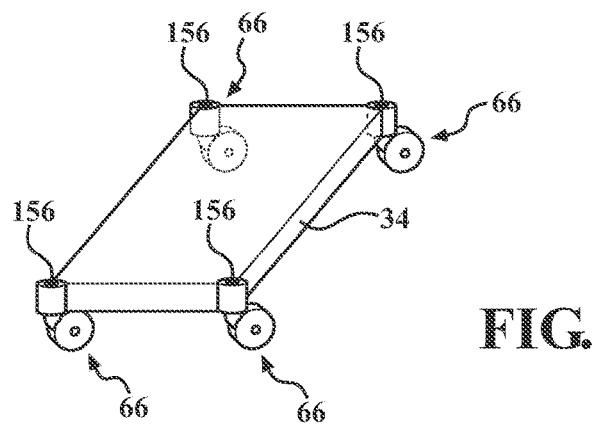
FIG. 17
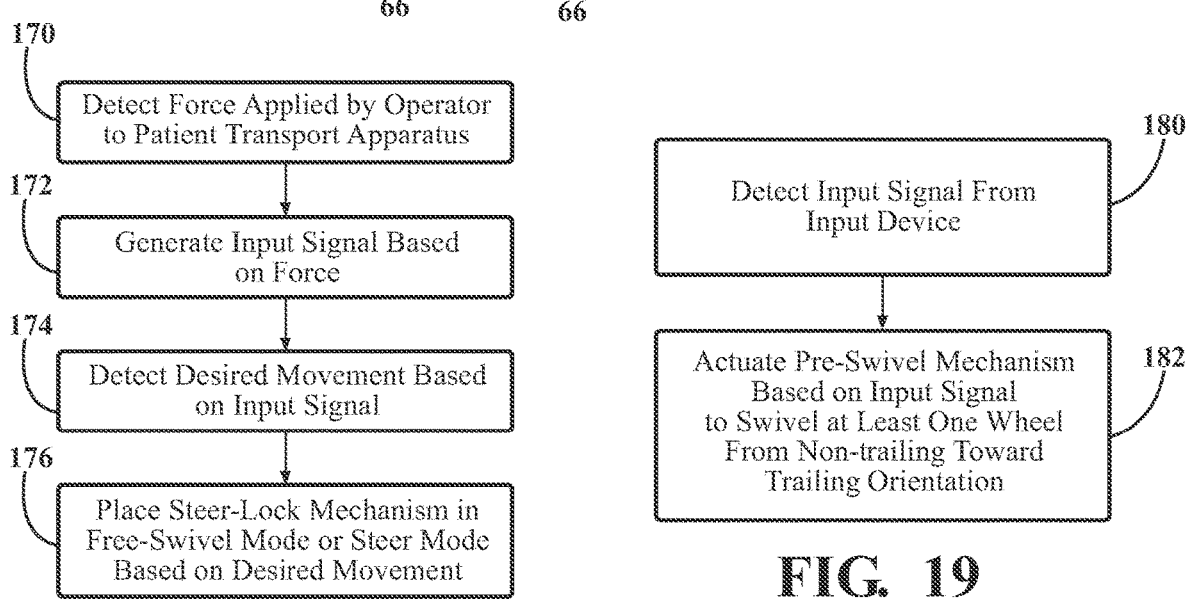
FIG. 18
FIG. 19

SYSTEMS AND METHODS FOR FACILITATING MOVEMENT OF A PATIENT TRANSPORT APPARATUS

CROSS-REFERENCE TO RELATED APPLICATION

This application is a divisional of U.S. patent application Ser. No. 15/336,068, filed on Oct. 27, 2016 and which claims priority to and the benefit of U.S. provisional patent application No. 62/247,396, filed on Oct. 28, 2015, the disclosures of each of which are hereby incorporated by reference in their entirety.

BACKGROUND

Patient transport apparatuses such as hospital beds, stretchers, cots, and wheelchairs are routinely used by operators to move patients from one location to another. Conventional patient transport apparatuses comprise a base and a patient support surface upon which the patient is supported. Wheels are coupled to the base to enable transport over floor surfaces. The wheels are often equipped with manual brake mechanisms to prevent movement of the patient transport apparatus, when desired. The manual brake mechanisms operate between braked and unbraked modes. In order to switch the manual brake mechanisms between modes, the operator actuates a foot pedal.

One of the wheels located at the foot end of the patient transport apparatus may also be equipped with a steer-lock mechanism to assist the operator in moving the patient transport apparatus down long hallways and around corners or obstacles. The steer-lock mechanism is operable in a free-swivel mode and a steer mode. In the free-swivel mode, all the wheels freely swivel about a swivel axis. This allows for movement of the patient transport apparatus in all directions, including lateral or sideways movement. In the steer mode, the steer-lock mechanism prevents its associated wheel from freely swiveling about the swivel axis. Preventing one of the wheels from swiveling inhibits "dog-tracking" or drifting to one side, thereby making movement of the patient transport apparatus easier when moving down long hallways. In order to switch the steer-lock mechanism between modes, the operator often is required to actuate the same foot pedal used to switch the manual brake mechanisms between modes.

Sometimes, engagement or disengagement of the manual brake mechanisms and/or the steer-lock mechanism can be challenging to the operator. It may be difficult for the operator to discern whether the manual brake mechanisms are in the braked mode or the unbraked mode and whether the steer-lock mechanism is in the free-swivel mode or the steer mode. The operator may forget to engage the foot pedal to switch the steer-lock mechanism to the steer mode in preparation for transport down a hallway or to switch back to the free-swivel mode in preparation for laterally moving the patient transport apparatus in a hospital room. In these cases, the operator can become frustrated with the difficulty associated with moving the patient transport apparatus. For example, when the operator pushes the patient transport apparatus laterally or sideways with the steer-lock mechanism in the steer mode, the wheel equipped with the steer-lock mechanism will be unable to swivel as needed. As a result, the patient transport apparatus will barely budge and the operator may incorrectly believe that the manual brake mechanisms are in the braked mode.

Initiating movement of the patient transport apparatus can also be challenging to the operator. For instance, if the wheels are caster wheels, much of the operator's initial effort in pushing or pulling on the patient transport apparatus is directed at first causing all of the wheels to align with the direction of desired movement so that the wheels have a trailing orientation with respect to the direction of desired movement.

Movement of the patient transport apparatus can also be challenging to the operator for other reasons, such as when electric brakes or other powered modules are employed on the patient transport apparatus and a battery power supply is depleted.

A patient transport apparatus with features designed to improve movement control for the operator and overcome one or more of the aforementioned challenges is desired.

BRIEF DESCRIPTION OF THE DRAWINGS

FIG. 5 is a partial perspective view of the caster assembly showing an interior of the caster assembly with the brake mechanism in an unbraked mode and with wheel parts removed.

FIG. 6 is a partial perspective view of the caster assembly showing an interior of the caster assembly with the brake mechanism in a braked mode and with the wheel parts removed.

FIGS. 15-17 are schematic illustrations of various arrangements of force sensors on the patient transport apparatus.

FIG. 18 is a flow diagram of steps for a method of automatically controlling the steer-lock mechanism.

FIG. 19 is a flow diagram of steps for a method of reducing a start-up force necessary to initiate movement of the patient transport apparatus by the operator.

DETAILED DESCRIPTION

Figure 1:
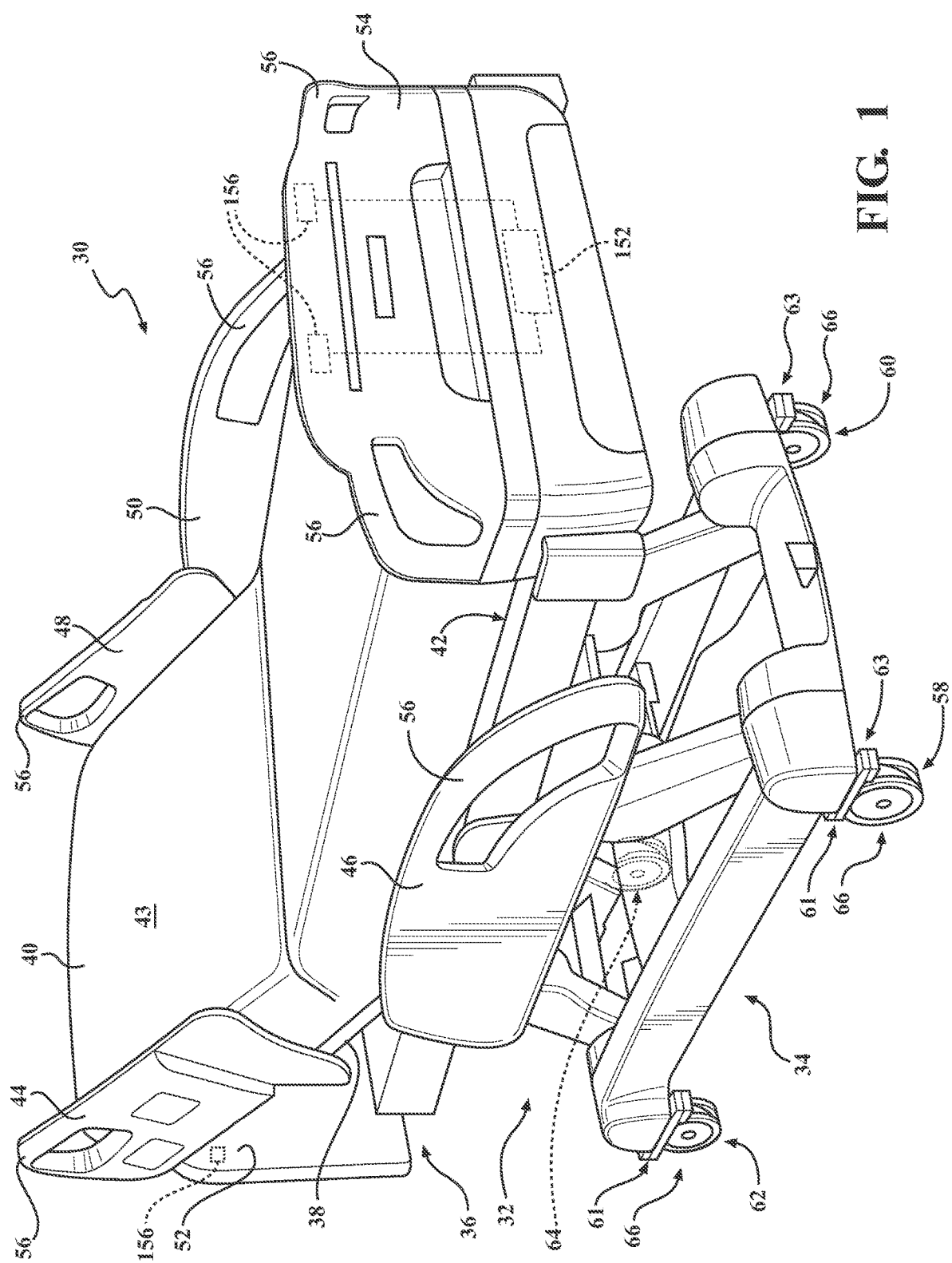
FIG. 1 is perspective view of a patient transport apparatus.

Referring to FIG. 1, a patient transport apparatus 30 is shown for moving a patient from one location to another. The patient transport apparatus 30 illustrated in FIG. 1 is a hospital bed. In other embodiments, however, the patient transport apparatus 30 may be a stretcher, cot, wheelchair, or similar apparatus.

A support structure 32 provides support for the patient during movement of the patient transport apparatus 30. The support structure 32 illustrated in FIG. 1 comprises a base 34 and an intermediate frame 36. The intermediate frame 36 is spaced above the base 34. The support structure 32 also comprises a patient support deck 38 disposed on the intermediate frame 36. The patient support deck 38 comprises several sections, some of which are pivotable relative to the intermediate frame 36, such as a head section, a seat section, a thigh section, and a foot section. The patient support deck 38 provides a patient support surface 42 upon which the patient is supported. The patient support surface 42 is supported by the base 34.

A mattress 40 is disposed on the patient support deck 38. The mattress 40 comprises a direct patient support surface 43 upon which the patient is supported. The base 34, intermediate frame 36, patient support deck 38, and patient support surfaces 42, 43 each have a head end and a foot end corresponding to the designated placement of the patient's head and feet on the patient transport apparatus 30. The construction of the support structure 32 may take on any known or conventional design, and is not limited to that specifically set forth above.

Side rails 44, 46, 48, 50 are coupled to the intermediate frame 36. A first side rail 44 is positioned at a right head end of the intermediate frame 36. A second side rail 46 is positioned at a right foot end of the intermediate frame 36. A third side rail 48 is positioned at a left head end of the intermediate frame 36. A fourth side rail 50 is positioned at a left foot end of the intermediate frame 36. If the patient transport apparatus 30 is a stretcher or a cot, there may be fewer side rails. The side rails 44, 46, 48, 50 are movable between a raised position in which they block ingress and egress into and out of the patient transport apparatus 30, and a lowered position in which they are not an obstacle to such ingress and egress. In still other configurations, the patient transport apparatus 30 may not include any side rails.

A headboard 52 and a footboard 54 are coupled to the intermediate frame 36. In other embodiments, when the headboard 52 and footboard 54 are included, the headboard 52 and footboard 54 may be coupled to other locations on the patient transport apparatus 30, such as the base 34. In still other embodiments, the patient transport apparatus 30 does not include the headboard 52 or the footboard 54.

Operator interfaces 56, such as handles, are shown integrated into the footboard 54 and side rails 44, 46, 48, 50 to facilitate movement of the patient transport apparatus 30 over the floor surfaces. Additional operator interfaces 56 may be integrated into the headboard 52 and/or other components of the patient transport apparatus 30. The operator interfaces 56 are graspable by the operator to manipulate the patient transport apparatus 30 for movement.

Other forms of the operator interface 56 are also contemplated. The operator interface may comprise one or more handles coupled to the intermediate frame 36. The operator interface may simply be a surface on the patient transport apparatus 30 upon which the operator logically applies force to cause movement of the patient transport apparatus 30 in one or more directions, also referred to as a push location. This may comprise one or more surfaces on the intermediate frame 36 or base 34. This could also comprise one or more surfaces on or adjacent to the headboard 52, footboard 54, and/or side rails 44, 46, 48, 50. In other embodiments, the operator interface may comprise separate handles for each hand of the operator. For example, the operator interface may comprise two handles.

Wheels 58, 60, 62, 64 are coupled to the base 34 to facilitate transport over floor surfaces. The wheels 58, 60, 62, 64 are arranged in each of four quadrants of the base 34 adjacent to corners of the base 34. In the embodiment shown, the wheels 58, 60, 62, 64 are caster wheels able to rotate and swivel relative to the support structure 32 during transport. Each of the wheels 58, 60, 62, 64 forms part of a caster assembly 66. Each caster assembly 66 is mounted to the base 34. It should be understood that various configurations of the caster assemblies 66 are contemplated. In addition, in some embodiments, the wheels 58, 60, 62, 64 are not caster wheels and may be non-steerable, steerable, non-powered, powered, or combinations thereof. Additional wheels are also contemplated. For example, the patient transport apparatus 30 may comprise four non-powered, non-steerable wheels, along with one or more powered wheels.

In other embodiments, one or more auxiliary wheels (powered or non-powered), which are movable between stowed positions and deployed positions, may be coupled to the support structure 32. In some cases, when these auxiliary wheels are located between caster assemblies 66 and contact the floor surface in the deployed position, they cause two of the caster assemblies 66 to be lifted off the floor surface thereby shortening a wheel base of the patient transport apparatus 30. A fifth wheel may also be arranged substantially in a center of the base 34.

Figure 2:
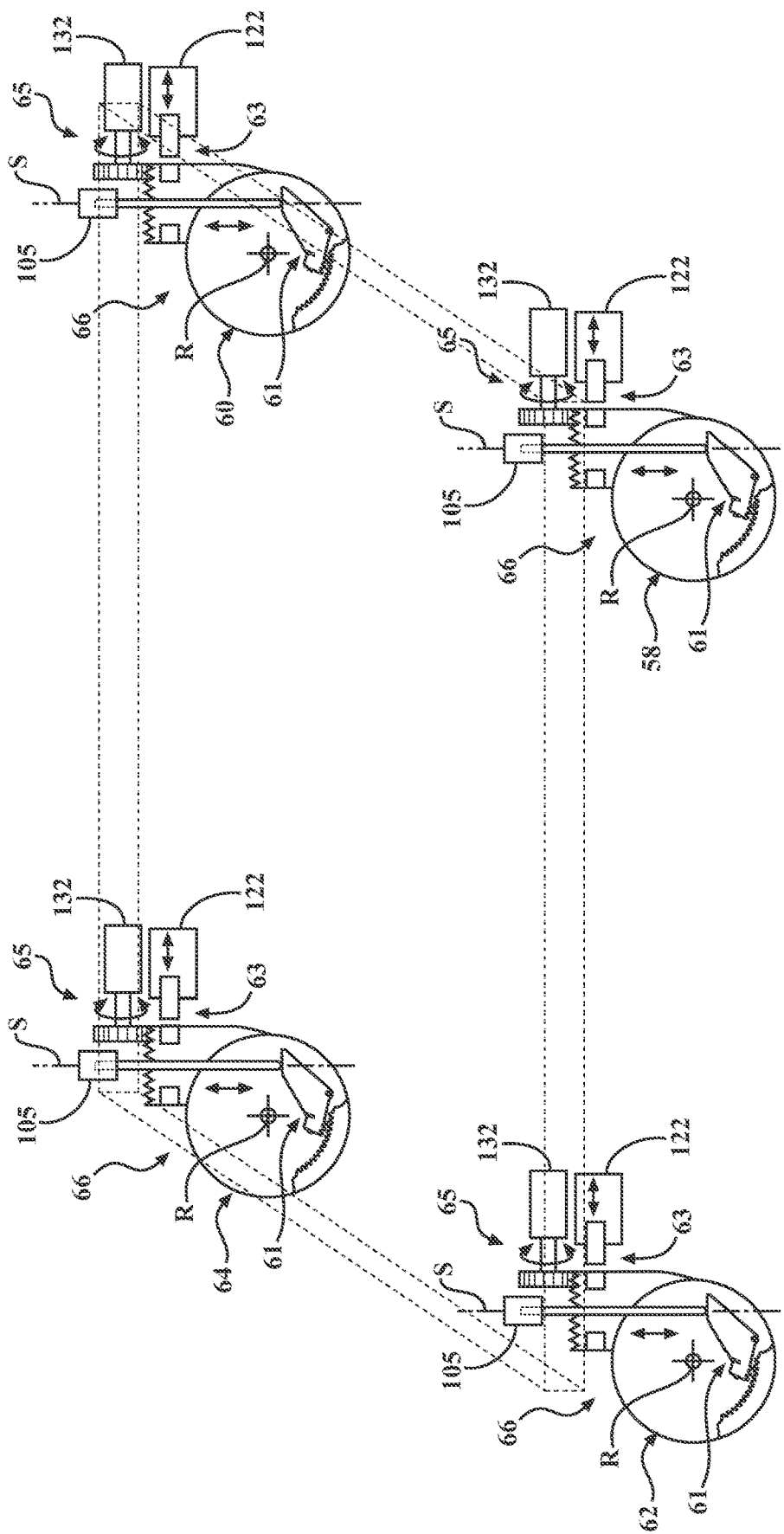
FIG. 2 is a schematic illustration of wheels controlled by brake mechanisms, steer-lock mechanisms, and pre-swivel mechanisms.

Referring to FIG. 2, each of the wheels 58, 60, 62, 64 are part of caster assemblies 66 and each rolls about a roll axis R. Each of the wheels 58, 60, 62, 64 also swivels about a swivel axis S, which may be oriented vertically with respect to the patient transport apparatus 30 and transverse to the roll axis R.

A brake mechanism 61 is coupled to each of the wheels 58, 60, 62, 64, to control rolling of the wheels 58, 60, 62, 64 about their roll axes R. In other embodiments, only one brake mechanism 61 is employed to control rolling of only one of the wheels 58, 60, 62, 64. In other embodiments, only two brake mechanisms 61 are employed to control rolling of only two of the wheels 58, 60, 62, 64. In further embodiments, additional brake mechanisms 61 can control rolling of other wheels, such as one or more auxiliary wheels, powered or non-powered.

In the exemplary embodiment shown, the brake mechanisms 61 are integrated into the caster assemblies 66.

However, it should be appreciated that the brake mechanisms 61 may assume any conventional design. The brake mechanisms 61 are operable in a braked mode and an unbraked mode. In the unbraked mode, the wheels 58, 60, 62, 64 are permitted to freely rotate about their roll axes R. In the braked mode, the wheels 58, 60, 62, 64 are prevented from freely rolling about their roll axes R to brake the patient transport apparatus 30.

A steer-lock mechanism 63 is coupled to each of the wheels 58, 60, 62, 64, to control swiveling of the wheels 58, 60, 62, 64. The wheels 58, 60, 62, 64 will swivel about their swivel axes S to align with a direction of desired movement of the patient transport apparatus 30 when an operator attempts to move the patient transport apparatus 30. When free to swivel, the wheels 58, 60, 62, 64 are able to automatically re-orient in any direction to facilitate movement. However, at the same time, when allowed to freely swivel, it may be difficult to steer the patient transport apparatus 30. In other embodiments, only one steer-lock mechanism 63 is employed to control swiveling of only one of the wheels 58, 60, 62, 64. In further embodiments, only two steer-lock mechanisms 63 are employed to control swiveling of only two of the wheels 58, 60, 62, 64. In still further embodiments, additional steer-lock mechanisms 63 can control swiveling of other wheels, such as one or more auxiliary wheels, powered or non-powered.

In the exemplary embodiment shown, the steer-lock mechanisms 63 form part of the caster assemblies 66. It should be appreciated that the steer-lock mechanisms 63 may assume any conventional design. Each of the steer-lock mechanisms 63 is operable in a free-swivel mode and a steer mode. In the free-swivel mode, the wheels 58, 60, 62, 64 are permitted to freely swivel about their swivel axes S. In the steer mode, the wheels 58, 60, 62, 64 are prevented from freely swiveling about their swivel axes S to improve steering of the patient transport apparatus 30.

In some embodiments, the steer-lock mechanisms 63, although present on all the caster assemblies 66, are selectively actuated to lock only one or two of the wheels 58, 60, 62, 64, while the remaining wheels 58, 60, 62, 64 remain able to freely swivel. For instance, when the operator is pushing on the head end of the patient transport apparatus 30 to move the patient transport apparatus 30 down a hallway, the wheels 58, 60 located at the foot end of the patient transport apparatus 30 are leading. In this case, locking either or both of the wheels 58, 60 makes steering down the hallway or around corners or obstacles easier.

A pre-swivel mechanism 65 is also coupled to each of the wheels 58, 60, 62, 64 to control an orientation of the wheels 58, 60, 62, 64. Much of the operator's effort in initiating movement of the patient transport apparatus 30, such as by pushing or pulling on the headboard 52, is directed to first causing all of the wheels 58, 60, 62, 64 to align with the direction of desired movement so that they have a trailing orientation with respect to the direction of desired movement. That is, a start-up force needed to move the patient transport apparatus 30 with the wheels 58, 60, 62, 64 in a non-trailing orientation, such as a leading orientation (180 degrees from the trailing orientation), is much greater than the start-up force needed to move the patient transport apparatus 30 with the wheels 58, 60, 62, 64 aligned in the trailing orientation. Often, for instance, a direction that the wheels assumed when the patient transport apparatus 30 was placed in a hospital room is the opposite direction that the wheels need to assume in order to move the patient transport apparatus 30 out of the hospital room. Thus, the starting orientation of the wheels 58, 60, 62, 64 is almost always in an opposite direction of the desired orientation. Once all the wheels 58, 60, 62, 64 become aligned, the effort needed to move the patient transport apparatus 30 is substantially reduced, such as by half or more. It should be understood that the trailing orientation does not strictly refer to a specific angular orientation but rather a general alignment relative to the direction of desired movement. For instance, if the patient transport apparatus 30 is moving in a first direction, the trailing orientation is the orientation of the wheels 58, 60, 62, 64 of the caster assemblies 66 in which the wheels 58, 60, 62, 64 roll generally in alignment with the first direction, but trailing relative to the swivel axis S. In some embodiments, pre-swivel mechanisms 65 are employed on less than all of the wheels 58, 60, 62, 64, e.g., only one, two, or three of the wheels have an associated pre-swivel mechanism 65.

In the embodiment shown, the pre-swivel mechanisms 65 form part of the caster assemblies 66. The pre-swivel mechanisms 65 are operable in a pre-swivel mode and a rest mode. In the pre-swivel mode, the pre-swivel mechanisms 65 are operated to supply all or a portion of the energy needed to turn one or more of the wheels 58, 60, 62, 64 to the trailing orientation before the operator begins to move the patient transport apparatus 30 so that the operator's work effort to initiate movement of the patient transport apparatus 30 is reduced. It should be appreciated that the pre-swivel mechanisms 65 may also be operated to supply all or a portion of the energy needed to turn one or more wheels 58, 60, 62, 64 simultaneously as the operator begins to move the patient transport apparatus 30. In the rest mode, the pre-swivel mechanisms 65 are inactive and are not configured to change the orientation of the wheels 58, 60, 62, 64.

The brake mechanisms 61, the steer-lock mechanisms 63, and/or the pre-swivel mechanisms 65 can all be independently actuated into several different mobility configurations. More specifically, each of the brake mechanisms 61, the steer-lock mechanisms 63, and/or the pre-swivel mechanisms 65 can be independently operated for each of the wheels 58, 60, 62, 64. For instance, the brake mechanism 61 associated with the wheel 58 can be actuated independently of the brake mechanisms 61 associated with each of the other wheels 60, 62, 64. This is the same for the steer-lock mechanisms 63 and the pre-swivel mechanisms 65. In some embodiments, the brake mechanisms 61, the steer-lock mechanisms 63, and/or the pre-swivel mechanisms 65 may be electronically linked together to be actuated together.

In one embodiment, there are at least four mobility configurations of the brake mechanisms 61, the steer-lock mechanisms 63, and the pre-swivel mechanisms 65. These mobility configurations comprise a free configuration, a braked configuration, a steer configuration, and a pre-swivel configuration. In the free configuration, all the brake mechanisms 61 are in the unbraked mode, all the steer-lock mechanisms 63 are in the free-swivel mode, and all the pre-swivel mechanisms 65 are in the rest mode. In the braked configuration, all the brake mechanisms 61 are in the braked mode, the steer-lock mechanisms 63 are either in the free-swivel mode or the steer mode, and all the pre-swivel mechanisms 65 are in the rest mode. In the steer configuration, all the brake mechanisms 61 are in the unbraked mode, one or more of the steer-lock mechanisms 63 are in the steer mode, and all the pre-swivel mechanisms 65 are in the rest mode. In the pre-swivel configuration, all the brake mechanisms 61 are in the unbraked mode, all the steer-lock mechanisms 63 are in the free-swivel mode, and one or more of the pre-swivel mechanisms 65 operate in the pre-swivel mode to swivel one or more of the wheels 58, 60, 62, 64 to be in the trailing orientation relative to a direction of desired movement. Of course, other mobility configurations are possible.

One of the caster assemblies 66 is shown in detail in FIGS. 3-7 without the steer-lock mechanism 63 or the pre-swivel mechanism 65. The caster assembly 66 comprises a wheel support 70. The wheel 58 comprises first and second wheel parts 90, 92 coupled to the wheel support 70 and rotatable relative to the wheel support 70 about the roll axis R. A spindle 72 is coupled to and extends from the wheel support 70. The spindle 72 comprises the swivel axis S. The spindle 72 also comprises a connector 73. The connector 73 comprises a threaded shaft and a fastener 75 to mount the caster assembly 66 to a frame member 35 of the base 34 so that the spindle 72 is fixed from moving relative to the frame member 35. The wheel support 70 and associated wheel 58 are arranged to swivel relative to the spindle 72 about the swivel axis S.

Figures 3, 4:
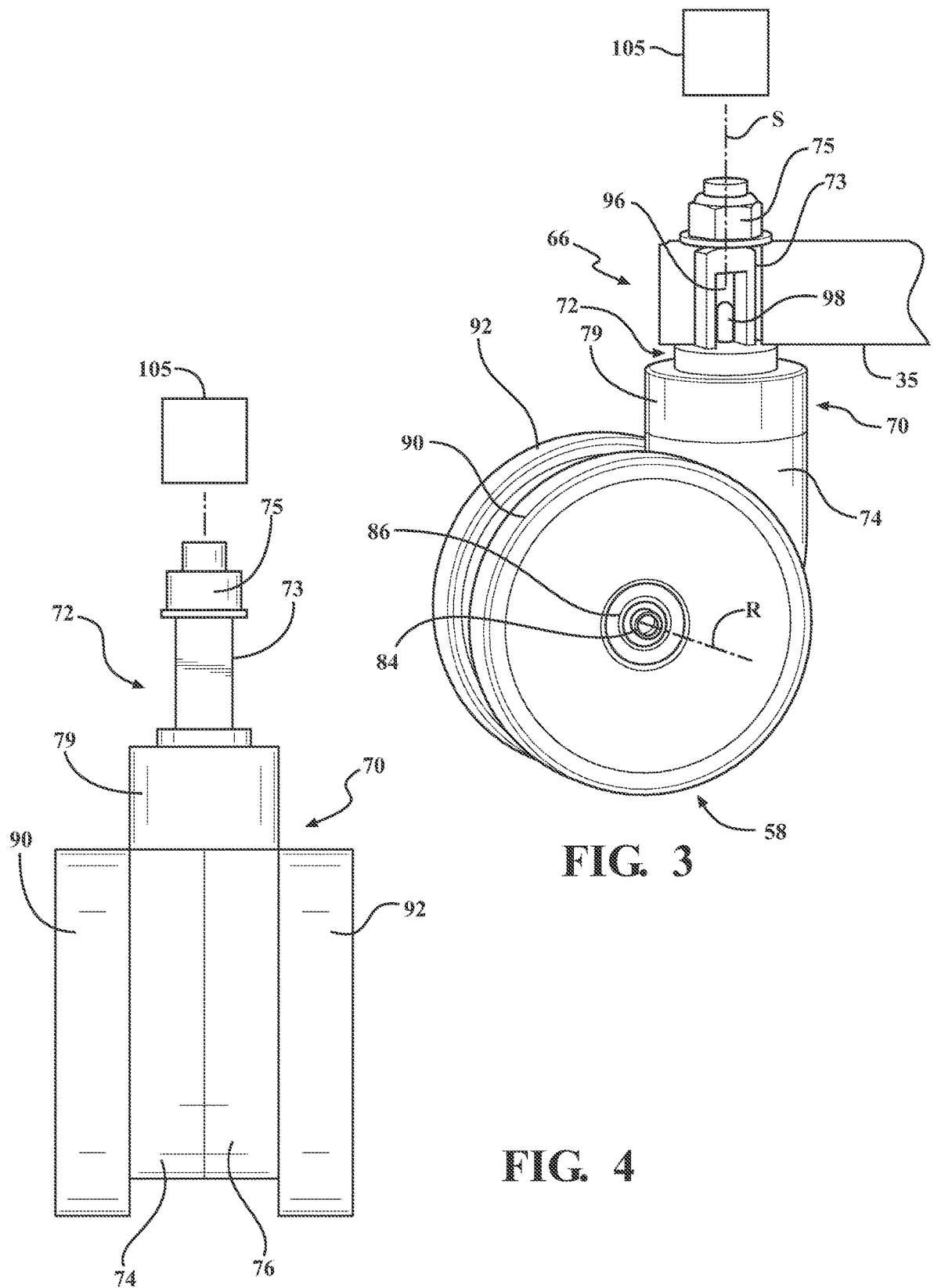
FIG. 3 is a perspective view of a caster assembly without the steer-lock mechanism or the pre-swivel mechanism.
FIG. 4 is an elevational front view of the caster assembly.

Referring to FIGS. 4 and 5, the wheel support 70 comprises a housing split into first and second housing components 74, 76. The first housing component 74 is coupled to the second housing component 76 to define an interior therebetween. The spindle 72 is captured in the interior between the first and second housing components 74, 76. The first and second housing components 74, 76 may be secured together with a snap-lock connection, adhesive, or the like. A cap 79 (shown in FIG. 3) is fitted to a neck portion of each of the first and second housing components 74, 76 to further secure the first and second housing components 74, 76 together.

As shown in FIGS. 5 and 6, the spindle 72 also comprises a shaft 78 fixed to the connector 73. A first bearing 80 and a second bearing 82 are disposed around the shaft 78 to enable swiveling of the wheel support 70 and associated wheel parts 90, 92 (not shown in FIGS. 5 and 6) relative to the shaft 78 about the swivel axis S. The bearings 80, 82 are arranged so that the first bearing 80 is closer to the frame member 35 than the second bearing 82. It should be appreciated that any number of bearings may be disposed around the shaft 78. The bearings 80, 82 are spaced apart to allow for load-sharing when the caster assembly 66 encounters bumps.

An axle 84 is coupled to the first and second housing components 74, 76. The axle 84 extends through and outside the first and second housing components 74, 76. The axle 84 defines the roll axis R. A first wheel bearing 86 is rotatably coupled to the axle 84 adjacent to the first housing component 74 and a second wheel bearing (not shown) is rotatably coupled to the axle 84 adjacent to the second housing component 76. The first wheel part 90 is coupled to the first wheel bearing 86 and the second wheel part 92 is coupled to the second wheel bearing. The first and second wheel parts 90, 92 are configured to rotate about the axle 84 and the roll axis R.

The spindle 72 is hollow and comprises an inner chamber along the swivel axis S. The spindle 72 additionally comprises a pair of spindle slots 96 in communication with the inner chamber. A plunger 98 is slidably disposed within the inner chamber. The plunger 98 is configured to slide along the swivel axis S.

Referring to FIGS. 5 and 6, a swivel-lock assembly 99 is disposed within the interior of the wheel support 70. The swivel-lock assembly 99 is configured to lock swiveling of the wheel 58 about the swivel axis S in the braked mode. This prevents additional movement of the patient transport apparatus 30 due to swiveling of the wheels 58, 60, 62, 64, when the brake mechanism 61 is in the braked mode. This could prevent another four to six inches of movement or more that might occur in embodiments without the swivel-lock assembly 99. By preventing swiveling, in addition to braking, this additional movement can be substantially eliminated. In some embodiments, the swivel-lock assembly 99 is absent from the caster assembly 66.

The swivel-lock assembly 99 comprises a first swivel-lock member 100 fixed in relation to the wheel support 70. The first swivel-lock member 100 is disposed for rotating with the wheel support 70 around the shaft 78. The first swivel-lock member 100 comprises circumferentially and equally spaced protrusions. The swivel-lock assembly 99 further comprises a second swivel-lock member 102 slidably coupled to the shaft 78, but fixed from rotating relative to the shaft 78 by a pin 97 (see FIG. 5A). The pin 97 engages the second swivel-lock member 102 and rides in a pair of opposing slots 101 in the shaft 78 (see FIG. 5A).

The second swivel-lock member 102 comprises circumferentially and equally spaced protrusions facing the first swivel-lock member 100 such that if the second swivel-lock member 102 were to engage with the first swivel-lock member 100, the first and second swivel-lock members 100, 102 would be placed in a meshing relationship, preventing relative rotation therebetween. The protrusions on the second swivel-lock member 102 engage the protrusions on the first swivel-lock member 100 when they align in one of several swivel-lock positions about the swivel axis S. In some embodiments, six, eight, ten, twelve, or more swivel-lock positions are possible.

The swivel-lock assembly 99 additionally comprises a biasing device 103 disposed around the shaft 78. The biasing device 103 biases the second swivel-lock member 102 into engagement with the first swivel-lock member 100 to restrict the wheel support 70 and associated wheel 58 from swiveling about the swivel axis S. The biasing device 103 is shown as a compression spring, but it should be appreciated that any suitable biasing device may be used.

A brake actuator 105 separates the second swivel-lock member 102 from the first swivel-lock member 100 by depressing the plunger 98. This disengages the swivel-lock assembly 99 by depressing the pin 97 and thereby sliding the second swivel-lock member 102 away from the first swivel-lock member 100. In one embodiment, the brake actuator 105 comprises a solenoid or other driver suitable to slide the plunger 98. In other embodiments, the brake actuator 105 may be a motor, such as a stepper motor or servo motor. It should be appreciated that the design of the swivel-lock assembly 99 may comprise alternative configurations other than those specifically described above.

Figure 5A:
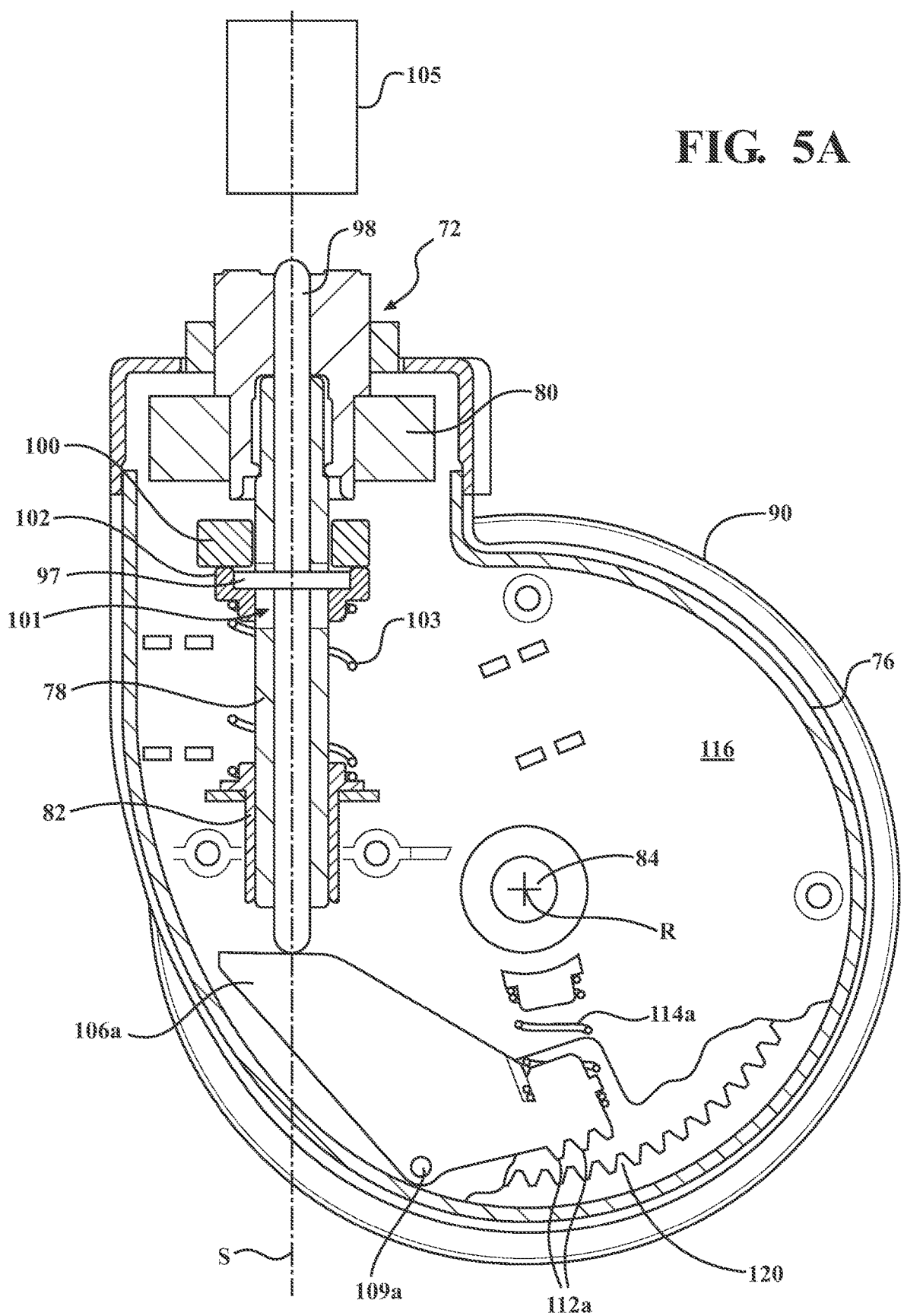
FIG. 5A is an elevational view of an alternative caster assembly showing an interior of the alternative caster assembly.

The brake mechanism 61 comprises a brake lever 106 pivotally coupled to the wheel support 70 by a pivot pin 109. A linkage 110 is pivotally coupled to the brake lever 106 by a pair of lever pins 111 integral with the brake lever 106. The first and second housing components 74, 76 further comprise a pair of locking pin slots 108 (only one locking pin slot 108 shown for the second housing component 76 in FIG. 5). The linkage 110 comprises a pair of locking pins 112. The locking pins 112 extend on opposite sides of the linkage 110 and through the locking pin slots 108 parallel to the roll axis R. In other embodiments, like that shown in FIG. 5A, the brake lever 106a is coupled to the wheel support 70 by the pivot pin 109a and the brake lever 106a is configured so that the linkage 110 is unnecessary. In the embodiment of FIG. 5A, the locking pins 112 are replaced by locking teeth 112a integrated into the brake lever 106a.

Figure 7:
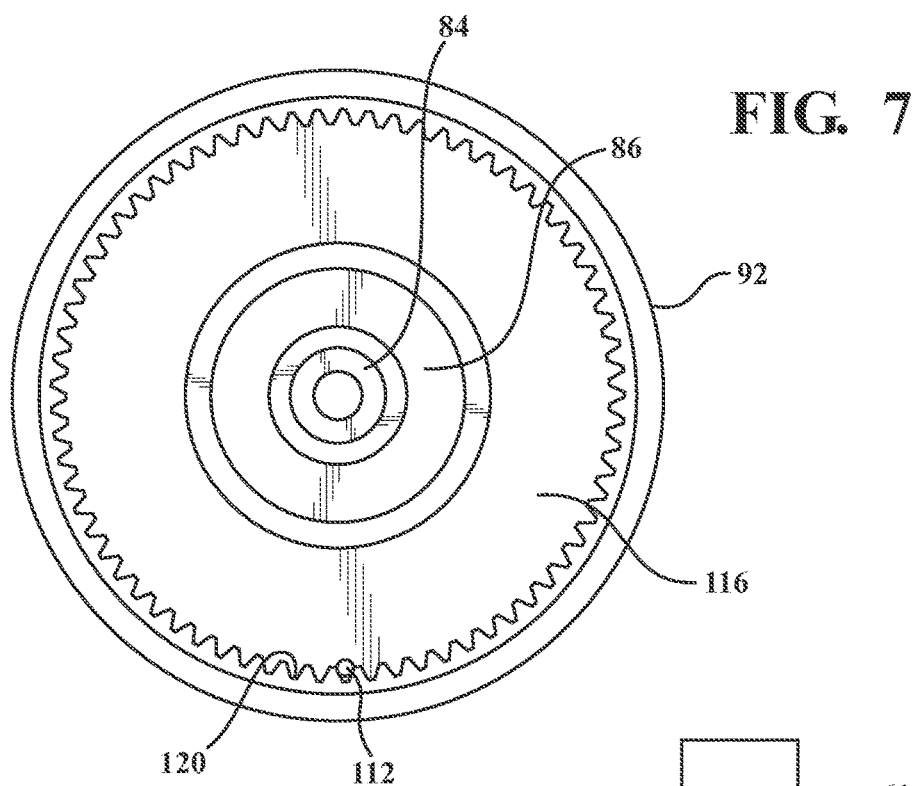
FIG. 7 is an elevational view of an inner surface of a wheel part of the caster assembly of FIG. 3.

The first and second wheel parts 90, 92 have inner surfaces 116 facing the first 74 and second 76 housing components (see FIG. 7). The first and second wheel parts 90, 92 further comprise wheel grooves 120 in the inner surfaces 116. A portion of the wheel grooves 120 are illustrated by dashed lines in FIGS. 5 and 6 for illustration purposes. The wheel grooves 120 are circumferentially and equally arranged 360 degrees around the wheel parts 90, 92 parallel to the roll axis R. The wheel grooves 120 are radially spaced from centers of the first and second wheel parts 90, 92.

In a normal, unactuated position of the plunger 98, rotation of the first and second wheel parts 90, 92 about the roll axis R is restricted by the brake mechanism 61. The brake mechanism 61 comprises a biasing device 114 acting between the wheel support 70 and the linkage 110. The biasing device 114 biases the locking pins 112 into engagement with the first and second wheel parts 90, 92. In particular, the locking pins 112 are biased into the wheel grooves 120 to restrict rotation of the wheel parts 90, 92 about the roll axis R. This represents the braked mode of the brake mechanism 61. In the embodiment of FIG. 5A, the biasing device 114a acts between the wheel support 70 and the brake lever 106a to bias the locking teeth 112a into the wheel grooves 120. The biasing devices 114, 114a are shown as compression springs, but it should be appreciated that any suitable biasing devices may be used.

To enable rotation of the first and second wheel parts 90, 92, the brake actuator 105, which forms part of the brake mechanism 61, is controlled to move the plunger 98 downwardly so that the plunger 98 abuts and depresses the brake lever 106, 106a. When depressed, the brake lever 106, 106a pivots about the pivot pin 109, 109a and lifts the locking pins 112/locking teeth 112a out of engagement with the wheel grooves 120. This represents the unbraked mode of the brake mechanism 61. When the plunger 98 moves downward, the second swivel-lock member 102 is also separated from the first swivel-lock member 100 to allow the wheel 58 to freely swivel.

In some embodiments, the brake mechanism 61 can cooperate with the swivel-lock assembly 99 so that the swivel-lock assembly 99 and the brake mechanism 61 can work in tandem. The brake mechanism 61 can also be separate and independent of the swivel-lock assembly 99 so that the swivel-lock assembly 99 can engage independently of the brake mechanism 61.

Figure 8A:
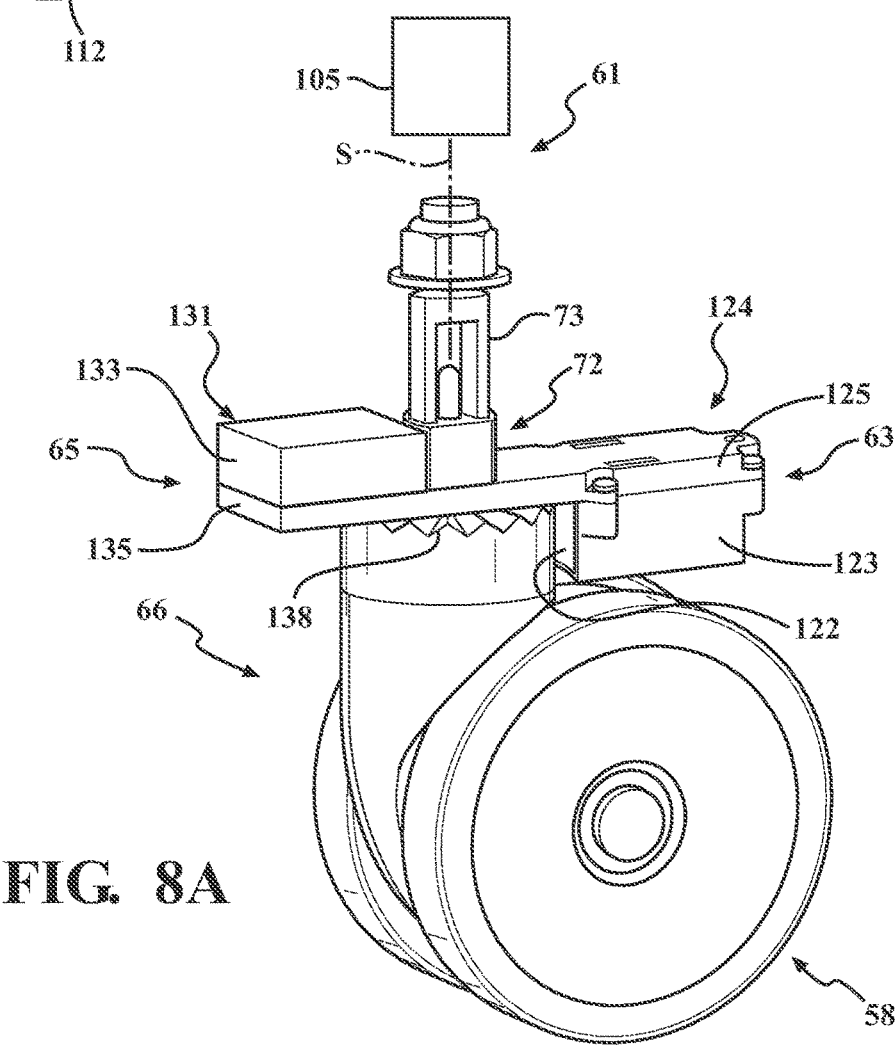
FIG. 8A is a perspective view of the caster assembly with the steer-lock mechanism and the pre-swivel mechanism.
Figure 8B:
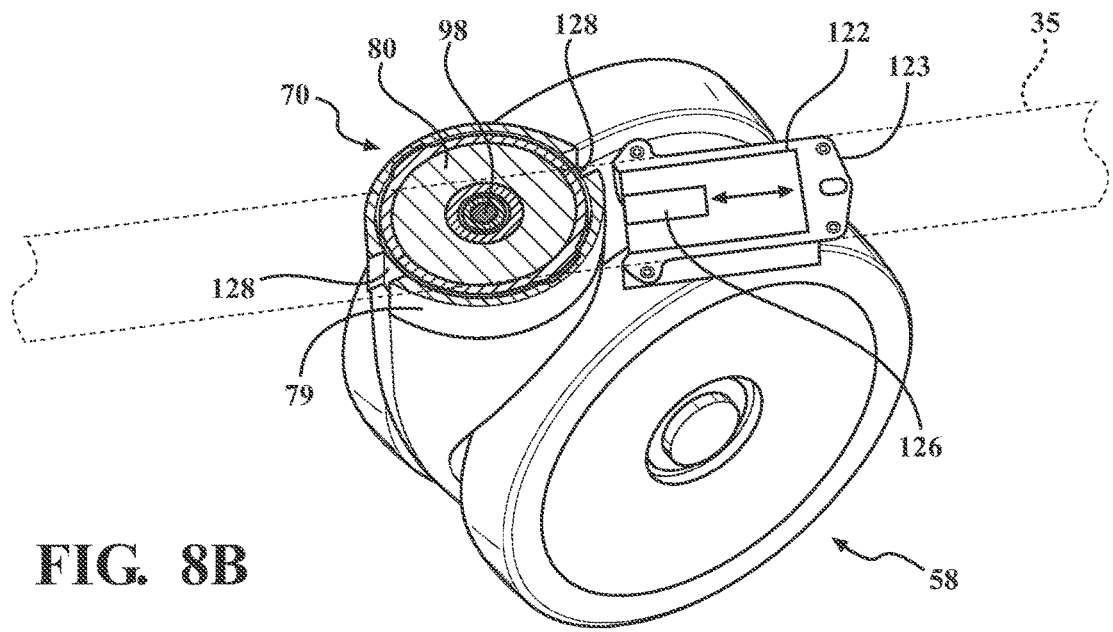
FIGS. 8B and 8C are perspective views of the steer-lock mechanism in the free-swivel mode and the steer mode, respectively.
Figure 8C:
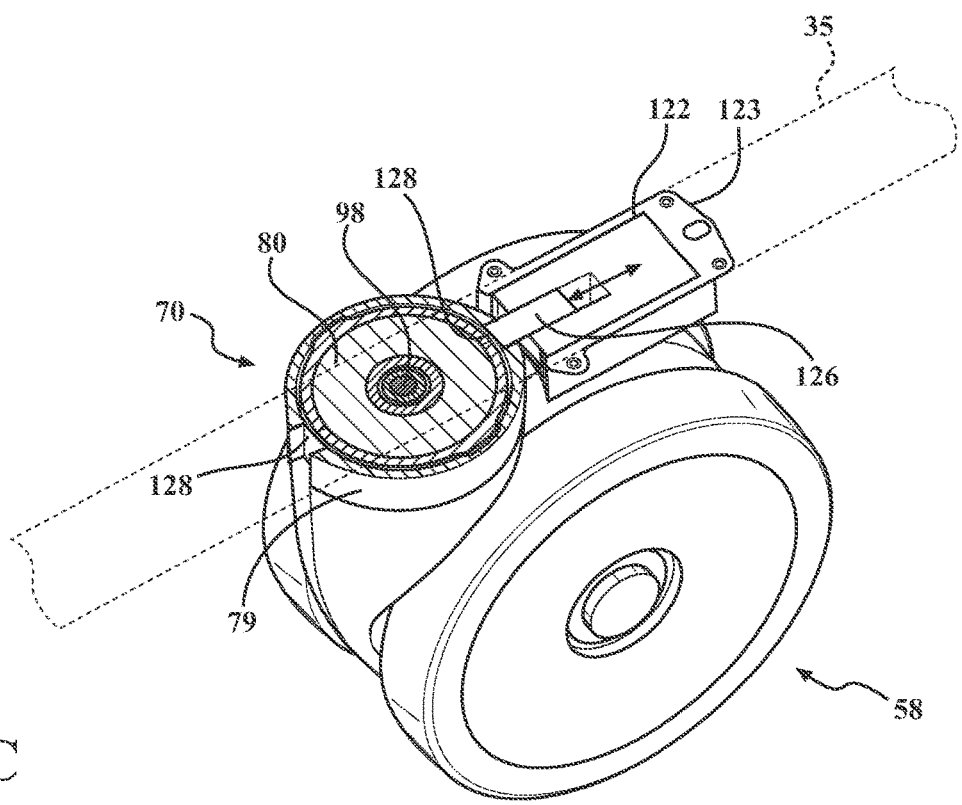

Referring to FIGS. 8A-8C, one embodiment of the steer-lock mechanism 63 is shown. It should be appreciated that, in some embodiments, other steer-lock designs may be utilized. The steer-lock mechanism 63 is different and independent of the swivel-lock assembly 99 described previously. As described, the swivel-lock assembly 99 has numerous swivel-lock positions to prevent swiveling of any of the wheels 58, 60, 62, 64 when the brake mechanism 61 is in the braked mode. This prevents movement of the patient transport apparatus 30 that might otherwise occur if the wheels 58, 60, 62, 64 were allowed to swivel, even though they are braked. Conversely, the steer-lock mechanism 63 is specifically intended to operate in the steer mode to make movement of the patient transport apparatus 30 easier. In some embodiments, the swivel-lock assembly 99 and the steer-lock mechanism 63 may be integrated into a single mechanism with the numerous swivel-lock positions also being used as steer-lock positions.

Referring to FIGS. 8A and 8B, each steer-lock mechanism 63 comprises a steer-lock actuator 122. The steer-lock actuator 122 is disposed and supported inside a housing 124. The housing 124 is attached to the spindle 72. The housing 124 comprises a base housing component 123 and a cover 125 mounted to the base housing component 123. The cover 125 is fixed to the spindle 72 so that the steer-lock actuator 122 is fully supported by the spindle 72 and fixed from rotating relative to the spindle 72. As a result, the wheel support 70 and associated wheel 58 swivel about the swivel axis S relative to the steer-lock actuator 122 in the free-swivel mode.

Referring to FIGS. 8B and 8C, a locking element 126 is driven by the steer-lock actuator 122 into engagement with the wheel support 70 in the steer mode. This engagement prevents free swiveling of the wheel support 70 and associated wheel 58 about the swivel axis S. The locking element 126 may be a latch, a spring-biased detent, or other element suitable to engage the wheel support 70 and prevent free swiveling of the wheel support 70 and associated wheel 58 about the swivel axis S. In some embodiments, the steer-lock actuator 122 is a solenoid and the locking element 126 is a linear latch actuated by the solenoid. Other electrically-controlled actuators are also contemplated.

In the embodiment shown, the wheel support 70 has a pair of opposing catches 128 for receiving the locking element 126. The catches 128 are defined through the cap 79 of the wheel support 70. The catches 128 are arranged 180 degrees apart to provide two steer-lock positions, so that in the steer mode, the wheel 58 is able to be locked in the trailing orientation depending on whether the patient transport apparatus 30 is being pushed from the head end or foot end of the patient transport apparatus 30, based on the direction of desired movement. In the free-swivel mode, the locking element 126 is disengaged from the catches 128.

In other embodiments, only one steer-lock position is provided. In still other embodiments, there are more steer-lock positions, such as two, three, four, or more steer-lock positions. Alternatively, the locking elements may be located on the wheel support 70 to engage a catch disposed in the housing 124. Thus, other arrangements of the locking element and catches are contemplated. The locking element and catches may have any suitable complementary geometry. For example, the locking element may comprise a hemispherical protrusion, while the catches may comprise hemispherical pockets. Alternatively, the locking element may comprise angular or rectangular protrusions and the catches may comprise geometry that allows the locking element to fixedly engage the catches. Other shapes are also possible for the locking element and catches such as spherical, cylindrical, or any other suitable shapes. Furthermore, steer-lock mechanisms that do no utilize a locking element and catch arrangement may also be suitable for the patient transport apparatus 30 in certain embodiments.

During operation, when the steer mode is desired, the steer-lock actuator 122 is activated to slide the locking element 126 toward the cap 79 in order to engage one of the catches 128. However, in the event that neither of the catches 128 are aligned with the locking element 126, the locking element 126 rides, or in some embodiments rolls, along an outer surface of the cap 79 until one of the catches 128 becomes aligned, at which time the locking element 126 engages that particular catch 128. A biasing device (not shown) such as a spring may be disposed between the locking element 126 and the steer-lock actuator 122 so that as the locking element 126 rides or rolls along the outer surface of the cap 79 the locking element 126 is continuously spring-biased against the cap 79 in order to easily fall into one of the catches 128.

Other brake mechanisms and steer-lock mechanisms are contemplated. The brake mechanism 61 and steer-lock mechanism 63 shown in FIGS. 3-7 and 8A-8C are considered positive lock mechanisms, but friction-based mechanisms or non-contact mechanisms, such as magnetic mechanisms, may also be used.

Figure 9:
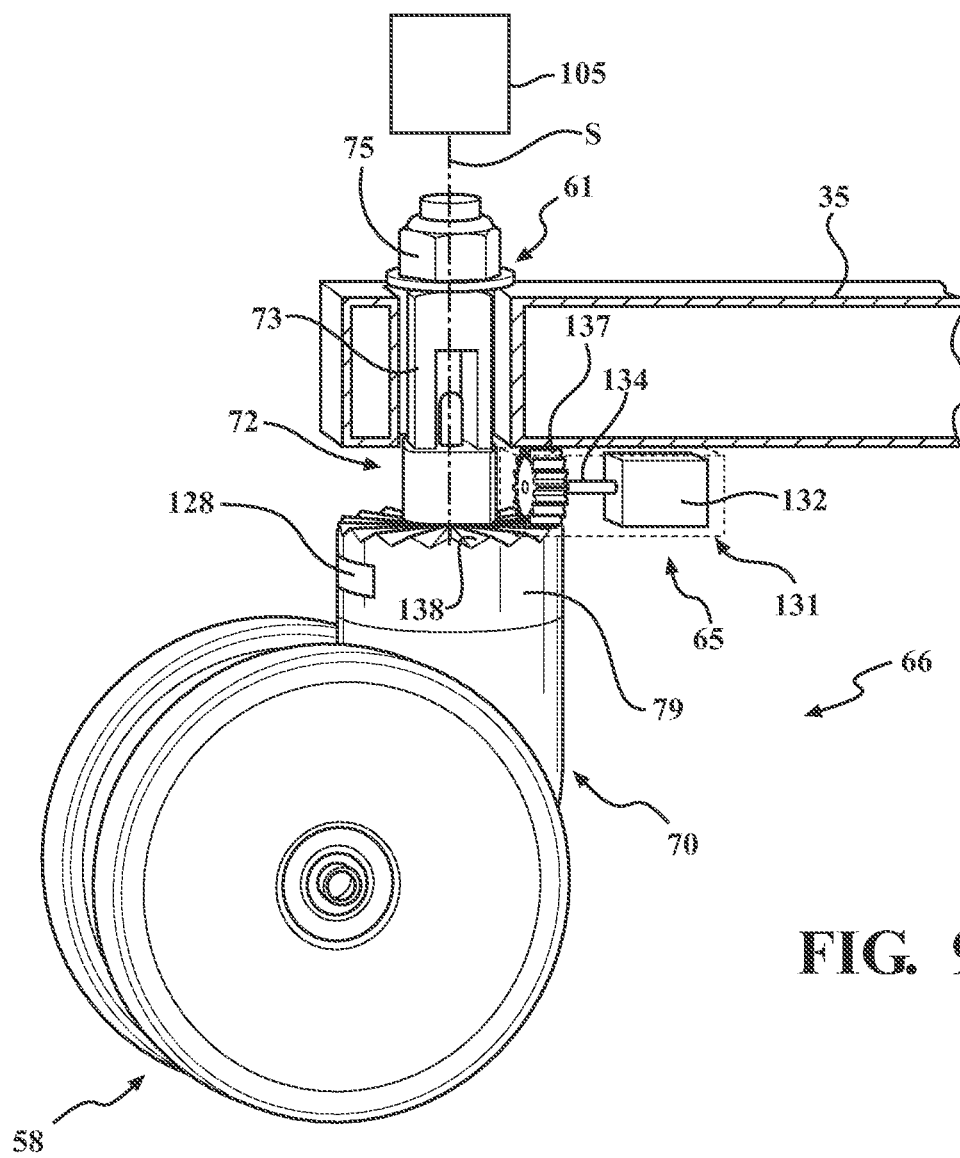
FIG. 9 is a schematic illustration of the pre-swivel mechanism.
Figure 10:
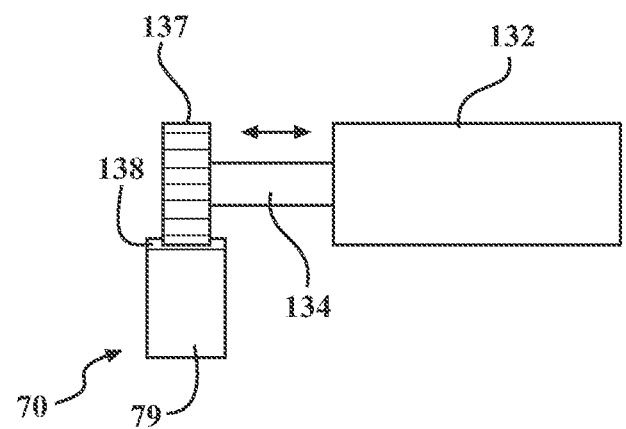
FIG. 10 is another schematic illustration of the pre-swivel mechanism.

FIGS. 8A, 9, and 10 illustrate one embodiment of the pre-swivel mechanism 65. In FIGS. 8A, 9, and 10, the pre-swivel mechanism 65 is shown on the caster assembly 66 with associated wheel 58. Like the steer-lock mechanism 63, the pre-swivel mechanism 65 is positioned at an elevation generally above the elevation of the corresponding wheel 58 (the steer-lock mechanism 63 is removed in FIG. 9 for illustration purposes). The pre-swivel mechanism 65 is configured to swivel the corresponding wheel 58 about the swivel axis S to its trailing orientation in the pre-swivel mode based upon control signals received by the pre-swivel mechanism 65.

In one exemplary embodiment, the pre-swivel mechanism 65 comprises a pre-swivel actuator 132. The pre-swivel actuator 132 is disposed and supported inside a housing 131. The housing 131 is mounted to the spindle 72. As shown in FIG. 8A, the housing 131 may comprise a base housing component 133 and a cover 135 mounted to the base housing component 133. The cover 135 is fixed to the spindle 72 so that the pre-swivel actuator 132 is fully supported by the spindle 72 and fixed from rotating relative to the spindle 72, similar to the steer-lock actuator 122. As a result, the wheel support 70 and associated wheel 58 swivel about the swivel axis S relative to the pre-swivel actuator 132 in the rest mode. In the embodiment shown, the cover 125 of the housing 124 for the steer-lock actuator 122 is integrally formed with the cover 135 of the housing 131 for the pre-swivel actuator 132.

Referring to FIG. 9, the pre-swivel actuator 132 may be a motor. The pre-swivel actuator 132 comprises a drive shaft 134 connected to a drive gear 137. The drive gear 137 is arranged to engage teeth 138 protruding upwardly on the cap 79 of the wheel support 70. The drive gear 137 and teeth 138 arrangement could be a pinion gear and crown arrangement, or other conventional gear arrangement. With the drive gear 137 engaging the teeth 138, rotation of the drive shaft 134 in the pre-swivel mode causes rotation of the drive gear 137 and corresponding swiveling of the wheel support 70 and associated wheel 58 about the swivel axis S toward the trailing orientation. It should be appreciated that the pre-swivel mechanism 65 may utilize other, non-geared devices in order to cause the swivel of the wheel support 70 and associated wheel 58 about the swivel axis S. For example, the pre-swivel mechanism 65 may be electrically coupled to or comprise one or more solenoids or servo motors that are configured to cause the wheel support 70 and associated wheel 58 to swivel about the swivel axis S. Other electrically-controlled pre-swivel actuators are also contemplated.

In some embodiments, like that shown in FIG. 9, the drive gear 137 remains engaged to the teeth 138 in the rest mode. In this embodiment, the pre-swivel actuator 132 is sufficiently backdriveable so that the wheel 58 still remains able to freely swivel about the swivel axis S when the pre-swivel mechanism 65 is in the rest mode. In other embodiments, such as shown in FIG. 10, the drive shaft 134 may be linearly retractable so that the drive gear 137 only selectively engages the teeth 138. In other words, the drive gear 137 engages the teeth 138 in the pre-swivel mode and disengages from the teeth 138 in the rest mode. In further embodiments, one or more of the wheels 58, 60, 62, 64 may be disengaged in the rest mode while one or more of the wheels 58, 60, 62, 64 remain engaged.

Figure 11:
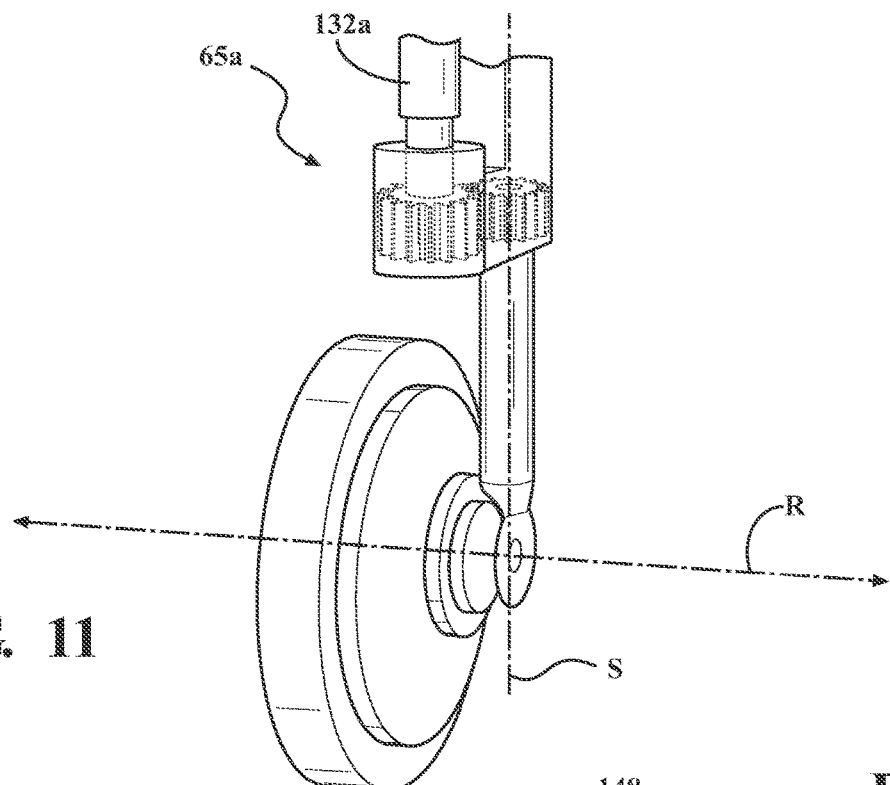
FIG. 11 is a perspective view of a wheel lacking a trailing and non-trailing orientation with an alternative pre-swivel mechanism.

Referring to FIG. 11, an alternative pre-swivel mechanism 65a can also be used on a swiveling wheel which does not have a trailing and leading orientation, such as a swiveling fifth wheel, a swiveling powered wheel, or a swiveling non-powered wheel. In this embodiment, the pre-swivel actuator 132a would be controlled to pre-swivel the fifth wheel, powered wheel, or non-powered wheel to align it with the direction of desired movement before movement commences. This pre-swiveling may occur with the fifth wheel, powered wheel, or non-powered wheel being in a stowed position, i.e., with the wheel raised off the floor surface. In some cases, swiveling of the wheels 58, 60, 62, 64, fifth wheel, powered wheel, or non-powered wheel is not allowed unless another command is first entered by the user, such as a input button on the headboard 52 or other component. This ensures that the operator is not surprised by sudden movement of the wheels 58, 60, 62, 64, fifth wheel, powered wheel, or non-powered wheel.

Pre-swiveling of the fifth wheel, powered wheel, or non-powered wheel further enhances the mobility of the patient transport apparatus 30 by further reducing the work needed to be input by the operator to initiate movement of the patient transport apparatus 30 in a desired direction. For instance, in some cases, if the fifth wheel, powered wheel, or non-powered wheel is deployed but aligned in the wrong direction with respect to the direction of desired movement, then additional work by the operator will be necessary to place the fifth wheel, the powered wheel, or the non-powered wheel in the desired direction. It should also be appreciated that pre-swivel mechanisms could be used on swiveling fifth wheels and/or swiveling powered wheels and/or other swiveling non-powered wheels that do have trailing and leading orientations.

Figure 12:
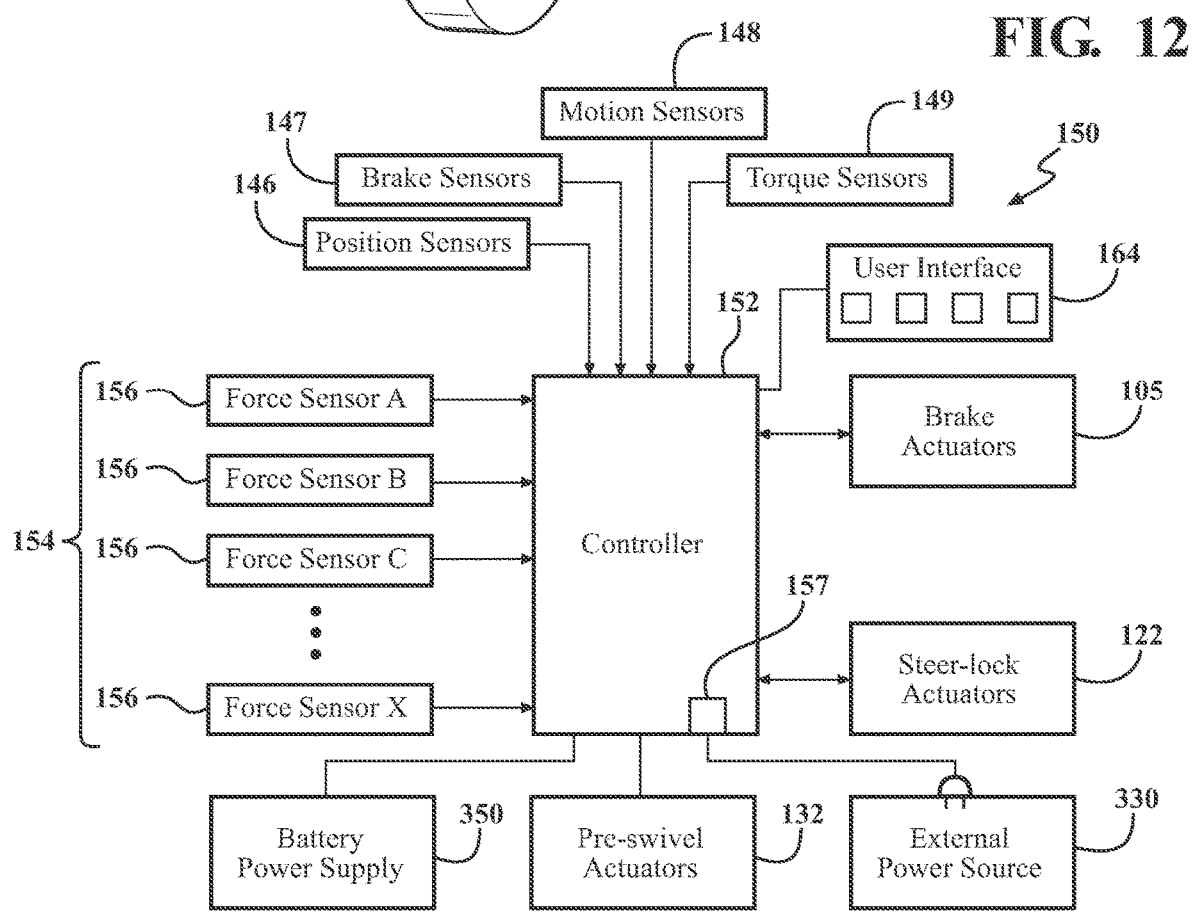
FIG. 12 is a schematic illustration of a control system.

Referring to FIG. 12, in some embodiments, a control system 150 is provided to control operation of the brake mechanisms 61, the steer-lock mechanisms 63, and/or the pre-swivel mechanisms 65. The control system 150 comprises a controller 152 having one or more microprocessors for processing instructions or for processing an algorithm stored in memory to switch between the different modes of the brake mechanisms 61, the steer-lock mechanisms 63, and the pre-swivel mechanisms 65. Additionally or alternatively, the controller 152 may comprise one or more microcontrollers, field programmable gate arrays, systems on a chip, discrete circuitry, and/or other suitable hardware, software, or firmware that is capable of carrying out the functions described herein.

The controller 152 is electronically coupled to the brake actuators 105, the steer-lock actuators 122, and the pre-swivel actuators 132. The controller 152 generates and transmits control signals to the brake actuators 105, the steer-lock actuators 122, and the pre-swivel actuators 132 to rotate their associated drive shafts, actuate their drivers, or otherwise cause desired operation of the brake actuators 105, the steer-lock actuators 122, and the pre-swivel actuators 132. The controller 152 may communicate with the brake actuators 105, the steer-lock actuators 122, and the pre-swivel actuators 132 via wired or wireless connections. Power to the brake actuators 105, the steer-lock actuators 122, the pre-swivel actuators 132, and the controller 152 may be provided by a battery power supply 350 or an external power source 330.

The controller 152 determines in which modes the brake mechanisms 61, the steer-lock mechanisms 63, and/or the pre-swivel mechanisms 65 should be placed. For instance, if the controller 152 determines that the operator is attempting to move the patient transport apparatus 30, the controller 152 may selectively place all of the brake mechanisms 61 in the unbraked mode and one or two of the steer-lock mechanisms 63 in the steer mode. In some cases, the controller 152 may place all of the brake mechanisms 61 in the unbraked mode, while all the steer-lock mechanisms 63 are kept in the free-swivel mode until motion has been detected in a constant direction for a predetermined period of time and then one or two of the steer-lock mechanisms 63 associated with the wheels leading the direction of movement are placed in the steer mode.

The controller 152 may also selectively determine which of the steer-lock mechanisms 63 to place in the steer mode based on a direction of desired movement of the patient transport apparatus 30. For instance, if the controller 152 senses that the operator is pushing on the head end of the patient transport apparatus 30, and hence desires to move the patient transport apparatus 30 in the direction of the foot end, then the steer-lock mechanisms 63 on the caster assemblies 66 located at the foot end may be placed in the steer mode. Conversely, if the controller 152 senses that the operator is pushing on the foot end of the patient transport apparatus 30, and hence desires to move the patient transport apparatus 30 in the direction of the head end, then the steer-lock mechanisms 63 on the caster assemblies 66 located at the head end may be placed in the steer mode. Thus, the control system 150 selectively transmits control signals to the appropriate steer-lock mechanisms 63 based on the direction of desired movement.

The controller 152 also determines whether to actuate the pre-swivel mechanisms 65 and, if so, how much to swivel each of the wheels 58, 60, 62, 64 and/or additional wheels, to place the wheels 58, 60, 62, 64 in the trailing orientation with respect to the direction of desired movement. This pre-swiveling preferably occurs before the operator exerts substantial force in attempting to move the patient transport apparatus 30. Thus, in certain configurations, the pre-swivel mechanism 65 only receives the control signal to engage the pre-swivel mode when the controller 152 determines that a force over a predetermined threshold is attempting to move the patient transport apparatus 30. However, in certain embodiments, this pre-swiveling may occur simultaneously while the operator is moving the patient transport apparatus such that the pre-swiveling mechanism assists in placing the wheels 58, 60, 62, 64 in the trailing orientation with respect to the direction of desired movement. For instance, one or more accelerometers could be placed on each of the caster assemblies 66 or elsewhere to detect acceleration and the associated direction of desired movement, and control the pre-swiveling mechanisms 65 accordingly.

In one embodiment, the control signal transmitted from the controller 152 is also tied to actuation of the brake mechanisms 61 and/or the steer-lock mechanisms 63. That is, when the operator desires to move the patient transport apparatus 30, based on one or more input signals as described further below, the control system 150 first places the brake mechanisms 61 in the unbraked mode, pre-swivels each of the wheels 58, 60, 62, 64 into the trailing orientation in the pre-swivel mode as determined by the input signals, and then switches one or more of the steer-lock mechanisms 63 to the steer mode.

As noted above, the non-trailing orientation of the wheels 58, 60, 62, 64 may be a leading orientation relative to the direction of desired movement of the patient transport apparatus 30. In this case, the pre-swivel mechanisms 65 are commanded by the controller 152 to swivel the wheels 58, 60, 62, 64 about the swivel axis S 180 degrees from the leading orientation to the trailing orientation. In cases where the drive gear 137 of the pre-swivel actuator 132 only rotates in one direction, the pre-swivel mechanisms 65 may swivel the wheels 58, 60, 62, 64 greater than 180 degrees between the non-trailing orientation and the trailing orientation. In other cases where the drive gears 137 rotate in both directions to pre-swivel the wheels 58, 60, 62, 64, the pre-swivel mechanisms 65 swivel the wheels 58, 60, 62, 64 anywhere from greater than 0 degrees to about 180 degrees from the non-trailing orientation to the trailing orientation.

In some embodiments, the controller 152 actuates the pre-swivel mechanisms 65 to swivel each of the wheels 58, 60, 62, 64 and/or additional wheels, merely toward the trailing orientation, but does not necessarily need to continue operating the pre-swivel mechanisms 65 until the wheels 58, 60, 62, 64 are fully in the trailing orientation with respect to the direction of desired movement, but instead can terminate operation of the pre-swivel mechanisms 65 with the wheels 58, 60, 62, 64 short of the trailing orientation so long as the work required by the operator to move the patient transport apparatus 30 has been reduced. Thus, the controller 152 may operate the pre-swivel mechanisms 65 until the orientation of the wheels 58, 60, 62, 64 is less than 90 degrees, less than 45 degrees, less than 20 degrees, less than 10 degrees, or less than 5 degrees from the trailing orientation.

In some embodiments, the patient transport apparatus 30 may comprise one or more position sensors 146 configured to determine a current orientation of each of the wheels 58, 60, 62, 64. These position sensors 146 are in communication with the controller 152. The position sensors 146 provide input signals to the controller 152 that enables the controller 152 to separately determine a current orientation of each of the wheels 58, 60, 62, 64 so that the controller 152 knows how much to pre-swivel each of the wheels 58, 60, 62, 64 to reach the trailing orientation from the non-trailing orientation. Often, each of the wheels 58, 60, 62, 64 will need to be pre-swiveled a different amount to reach the trailing orientation, depending on how the wheels 58, 60, 62, 64 were oriented when the patient transport apparatus 30 was last moved. Accordingly, in some cases, the pre-swivel mechanisms 65 may only need to engage and pre-swivel one, two, or three wheels at a time.

In further embodiments, the controller 152 may be configured to only actuate one or more of the pre-swivel mechanisms 65 when their associated wheels 58, 60, 62, 64 are at an orientation of about 90 degrees relative to their trailing orientation, e.g., 90 degrees+/−15 degrees, 90 degrees+/−10 degrees, 90 degrees+/−5 degrees, or 90 degrees+/−1 degree. This orientation range represents the largest resistance to movement in the desired direction because the wheels 58, 60, 62, 64 are unable to immediately roll when the operator pushes the patient transport apparatus 30. This orientation range is referred to as a stalling orientation range and any orientation within this range is referred to as a stalling orientation. If only two of the wheels 58, 60, 62, 64, for example, are within the stalling orientation range initially, then only the two pre-swivel mechanisms 65 for those two wheels are actuated to overcome the resistance to movement that they cause. Presumably, the remaining wheels are at least able to roll and thereby provide less resistance to movement. Nevertheless, some of the wheels 58, 60, 62, 64 may be greater than about 90 degrees from their trailing orientation, meaning that they will at some point pass through the stalling orientation range. In this case, their associated pre-swivel mechanisms 65 may remain unactuated until the wheels reach the stalling orientation range at which time the controller 152 activates the corresponding pre-swivel mechanisms 65 to pre-swivel the corresponding wheels through the stalling orientation range.

The position sensors 146 may be encoders on the pre-swivel actuators 132 that measure rotation of the drive shafts 134 of the pre-swivel actuators 132 and correlate such rotation with current orientation. The position sensors 146 may also be encoders disposed between the wheel supports 70 of the caster assemblies 66 and the spindles 72 to measure rotation of the wheel supports 70 relative to the spindles 72. For instance, the encoders may be positioned inside the caps 79. Of course, the modality of the position sensors 146 is not particularly important, and any suitable configuration may be utilized so long as the position sensors 146 are able to determine the orientation of the wheels 58, 60, 62, 64 relative to the trailing and non-trailing orientations.

The patient transport apparatus 30 may comprise brake sensors 147 to determine whether the brake mechanisms 61 are in the braked mode or the unbraked mode. The brake sensors 147 are in communication with the controller 152. The brake sensors 147 provide input signals into the controller 152 so that the controller 152 is able to determine whether the brake mechanisms 61 are in the braked mode or the unbraked mode. The brake sensors 147 may be mechanically actuated switches on the plungers 98 of each of the caster assemblies 66 that are tripped when the actuators 105 move the plungers 98. Alternatively, Hall-Effect sensors integrated into the actuators 105 could be used to determine a position of a drive shaft or other driver of the actuator 105. In other embodiments, the controller 152 can be programmed to keep track of actuations of the actuator 105 and thus keep track of whether the brake mechanisms 61 are in the braked mode or the unbraked mode based on counts. This method can be employed, for instance, in cases where the actuators 105 comprise linear solenoids. The brake sensor 147 may also be integrated into, or at least responsive to, a user input device by which the operator electronically actuates the brakes.

The patient transport apparatus 30 may comprise motion sensors 148 to monitor the number of rotations of one or more of the wheels 58, 60, 62, 64 or movement of the patient transport apparatus 30. The motion sensors 148 may comprise wheel encoders, optical sensors, infrared sensors, and the like. The motion sensors 148 are in communication with the controller 152 to provide associated input signals to the controller 152. This enables the controller 152 to roughly determine the distance the patient transport apparatus 30 has traveled in certain time periods as well as determine the speed and/or acceleration of the patient transport apparatus 30. The controller 152 may be configured to transmit control signals to one or more of the steer-lock mechanisms 63 to switch to the steer mode when the patient transport apparatus 30 has moved at least a predetermined distance. Further, by monitoring the difference in rotation counts between two encoders coupled to wheels on opposite sides of the patient transport apparatus 30, turns of the patient transport apparatus 30 are able to be detected. Likewise, the controller 152 can determine when movement is in a constant direction. Accordingly, the controller 152 can delay transmitting the control signals to the steer-lock mechanisms 63 to switch to the steer mode until movement is detected in a constant direction for a predetermined period of time. The controller 152 may be configured to only actuate the pre-swivel mechanisms 65 at low speeds of the patient transport apparatus 30, such as at speeds of less than 1.0 miles per hour, less than 0.5 miles per hour, less than 0.25 miles per hour, between 0.0 and 1.0 miles per hour, between 0.0 and 0.5 miles per hour, or between 0.0 and 0.25 miles per hour. Other sensors, such as gyroscopes, accelerometers, ultrasonic sensors, and/or still other sensors can also be used to provide additional movement and/or movement direction information.

Torque sensors 149 are in communication with the controller 152. The torque sensors 149 can generate and transmit input signals to the controller 152 corresponding to the amount of torque applied to the wheels 58, 60, 62, 64 with respect to the swivel axis S when the steer-lock mechanisms 63 are in the steer mode or the pre-swivel mechanisms 65 are in the pre-swivel mode. The torque sensors 149 may be located on the steer-lock mechanisms 63 and/or the pre-swivel mechanisms 65. The torque sensors 149 may comprise strain gages, or other suitable transducers. The controller 152 switches the steer-lock mechanisms 63 from the steer mode to the free-swivel mode if a torque of the associated wheel exceeds a predetermined threshold in the steer mode. Likewise, the controller 152 switches the pre-swivel mechanism 65 to the rest mode if a torque of the associated wheel exceeds a predetermined threshold in the pre-swivel mode. Torque sensors could also be employed to generate and transmit input signals to the controller 152 corresponding to the amount of wheel torque applied to the wheels 58, 60, 52, 64 about the rolling axis R when in the braked mode. If the wheel torque exceeds a predetermined threshold, the brake mechanisms 61 may be released to prevent damage to the brake mechanisms 61. Alternatively, repetitive braking could be employed to continuously brake and unbrake the wheels 58, 60, 62, 64 to limit movement of the patient transport apparatus 30 while still preventing damage to the brake mechanisms 61.

In some embodiments, the patient transport apparatus 30 may comprise a force sensing system 154 that is in communication with the controller 152. The force sensing system 154 detects forces applied by the operator to the patient transport apparatus 30 and generates one or more input signals based on one or more forces. The controller 152 receives the input signals, determines a desired movement of the patient transport apparatus 30 based on the input signals, which may be based on the one or more forces, and controls the brake mechanisms 61, the steer-lock mechanisms 63, and/or the pre-swivel mechanisms 65 based on the desired movement of the patient transport apparatus 30 by transmitting control signals to the brake actuators 105, the steer-lock actuators 122, and/or the pre-swivel actuators 132. The desired movement of the patient transport apparatus 30 may comprise the operator's desire to move the patient transport apparatus 30, the operator's desire for the patient transport apparatus 30 to be stationary, the operator's direction of desired movement, or other mobility states for the patient transport apparatus 30.

In some cases, the controller 152 transmits the control signals to the brake actuators 105, the steer-lock actuators 122, and/or the pre-swivel actuators 132 when a predetermined amount of time has elapsed after the controller 152 determines the desired movement of the patient transport apparatus 30 or after the controller 152 receives the initial input signals. For instance, the controller 152 is configured to transmit the control signals to one or more of the steer-lock mechanisms 63 when a predetermined period of time, such as from 1 to 10 seconds, 3 to 8 seconds, 3 to 5 seconds, at least 5 seconds, at least 3 seconds, or other suitable period of time, has elapsed after the controller 152 determines the direction of desired movement of the patient transport apparatus 30.

In one case, when the force sensing system 154 detects zero or near-zero forces being applied to the patient transport apparatus 30, which suggests that the desired movement of the patient transport apparatus 30 is that the patient transport apparatus 30 remain stationary, the controller 152 places all the brake mechanisms 61 in the unbraked mode and all the steer-lock mechanisms 63 in the free-swivel mode to allow the wheels 58, 60, 62, 64 to freely swivel and move in case the operator wants to move the bed laterally. Alternatively, the controller 152 may place all the brake mechanisms 61 automatically in the braked mode when zero or near-zero forces are detected and wait until a force above a certain threshold is again measured before proceeding to switch all the brake mechanisms 61 to the unbraked mode.

Figure 13:
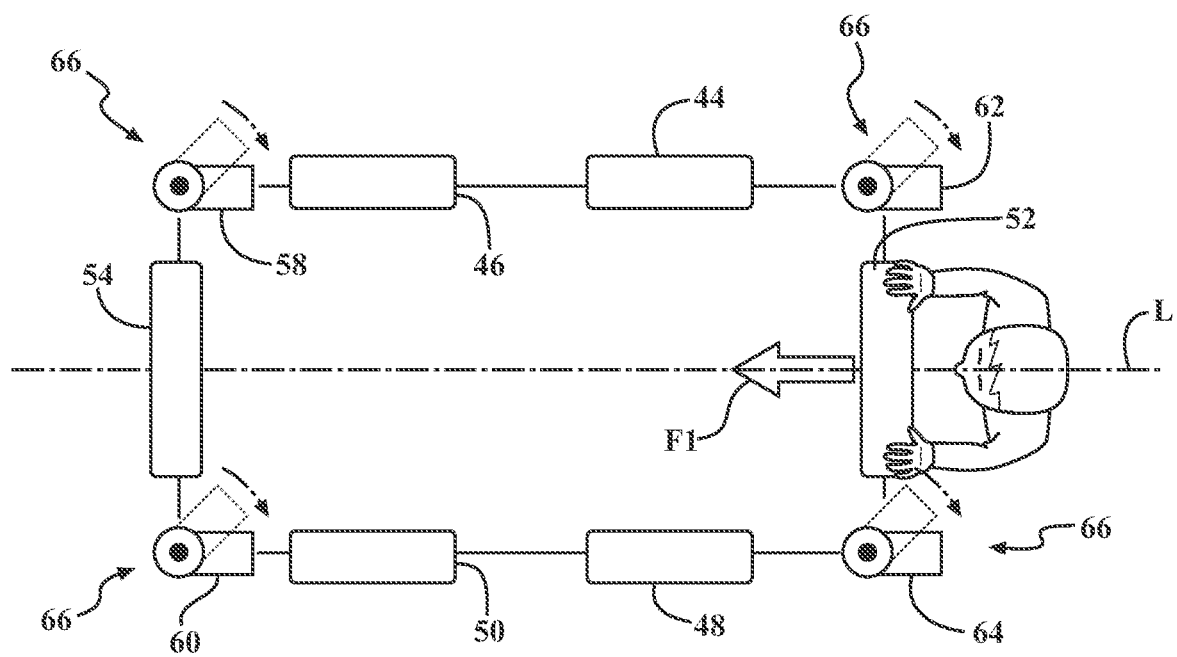
FIG. 13 is a schematic illustration of an operator pushing on a headboard to move the patient transport apparatus.

In another case, referring to FIG. 13, the force sensing system 154 detects a component of the force F1 applied by the operator to the patient transport apparatus 30 that is parallel to a longitudinal axis L of the patient transport apparatus 30. This component determines a direction of desired movement of the patient transport apparatus 30. Once the direction of desired movement is determined, the controller 152 can determine which of the pre-swivel mechanisms 65 to activate so that all of the wheels 58, 60, 62, 64 are moved to their trailing orientations, and how much to pre-swivel each of the wheels 58, 60, 62, 64. For instance, if the controller 152 detects that the patient transport apparatus 30 is moving in a first direction by virtue of the operator pushing on the headboard 52 as detected by the force sensing system 154, then the controller 152 activates the pre-swivel mechanisms 65 so that all of the wheels 58, 60, 62, 64 are re-oriented to be trailing relative to the first direction, as shown in FIG. 13. In some embodiments, the controller 152 controls the pre-swivel mechanisms 65 so as to anticipate the motion of the patient transport apparatus 30 that would naturally occur as the result of the applied forces. In this manner, the direction and/or magnitude of the operator's applied forces determine the direction of desired movement of the patient transport apparatus 30, but before movement actually occurs.

Once the direction of desired movement is determined, the controller 152 can also determine which of the steer-lock mechanisms 63 to switch to the steer mode. For instance, if the controller 152 detects that the patient transport apparatus 30 is moving in the first direction by virtue of the operator pushing on the headboard 52 as detected by the force sensing system 154, then the controller 152 activates the steer-lock mechanisms 63 on the caster assemblies 66 adjacent to the foot end to place them in the steer mode. Again, this may occur after the patient transport apparatus 30 moves in this direction continuously for a predetermined period of time. By waiting for continued movement in this direction, it is likely that the wheels 58, 60, which are currently able to freely swivel about the swivel axis S, will align with the direction of motion. Otherwise, in embodiments having multiple steer-lock positions, the steer-lock mechanisms 63 may lock in an undesired steer-lock position, i.e., one that is not yet aligned with the direction of desired movement.

Figure 14:
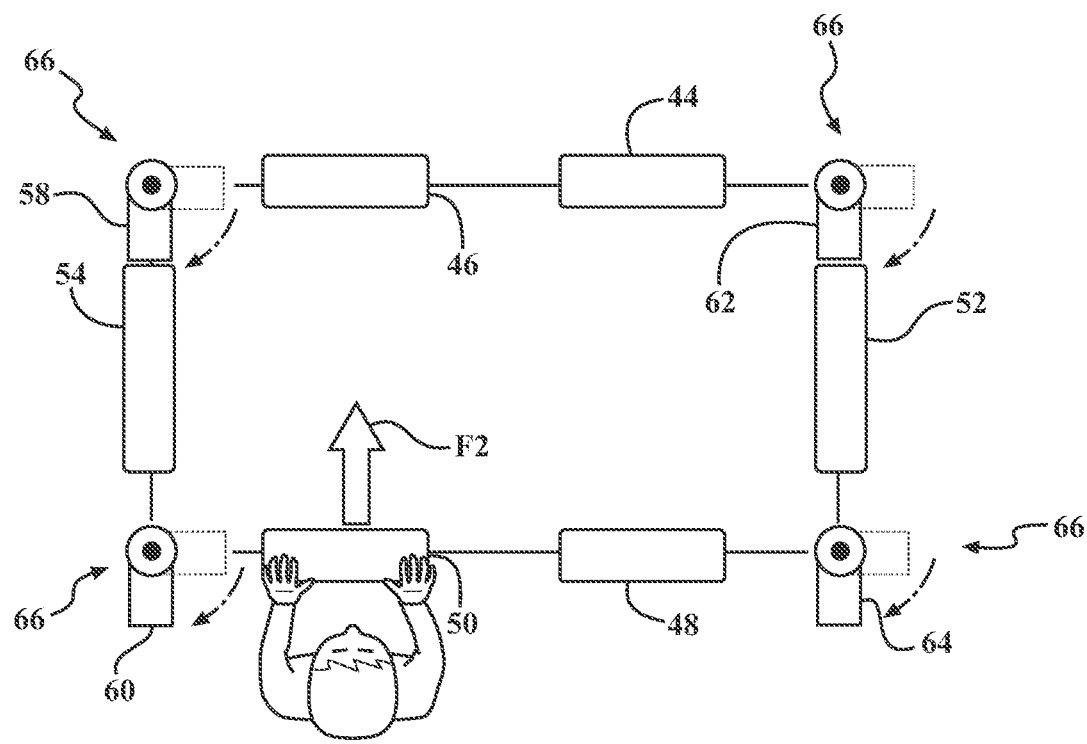
FIG. 14 is a schematic illustration of the operator pushing on a side rail to move the patient transport apparatus.

Referring to FIG. 14, the force sensing system 154 can also detect a second force F2 applied laterally to the patient transport apparatus 30 while the operator is located adjacent to a first longitudinal side or a second longitudinal side of the patient transport apparatus 30 as the patient transport apparatus 30 is moving along a hallway. The controller 152 switches the steer-lock mechanisms 63 from the steer mode to the free-swivel mode if the second force F2 exceeds a predetermined threshold. This may occur when the patient transport apparatus 30 is being pushed down the hallway with one or two of the steer-lock mechanisms 63 in the steer mode, but subsequently the patient transport apparatus 30 needs to move laterally. The need for lateral movement is detected by observing the second force F2 being applied laterally to the patient transport apparatus 30. This desire for lateral movement can further be detected by the force F1 initially being applied by the operator when moving down the hallway decreasing to zero. As a result, all the steer-lock mechanisms 63 should be placed in the free-swivel mode.

The force sensing system 154 comprises one or more force sensors 156. The controller 152 is configured to determine a magnitude of the forces applied by the operator to the patient transport apparatus 30 based on input signals from the force sensors 156. The controller 152 is configured to transmit the control signals to the pre-swivel actuators 132 to place the wheels 58, 60, 62, 64 in their trailing orientation and/or to the steer-lock actuators 122 to place the steer-lock mechanisms 63 in the steer mode if the magnitude of the force applied by the operator exceeds a predetermined threshold. In some cases, when the magnitude of the force does not exceed the predetermined threshold, no action is taken by the controller 152 to change modes of the pre-swivel actuators 132 or the steer-lock actuators 122.

In one embodiment, the force sensors 156 are coupled to one or more of the operator interfaces 56, such as handles at the head end of the patient transport apparatus 30 to indicate when the operator is attempting to push the patient transport apparatus 30 from the head end. The force sensors 156 may also be coupled to the headboard 52 or the footboard 54. The force sensors 156 may also be located elsewhere on the patient transport apparatus 30 adjacent to the head end, foot end, sides, or combinations thereof. In other embodiments, the force sensors 156 can be placed in IV poles, side rails, the intermediate frame 36 or any other push location of the patient transport apparatus 30.

The force sensors 156 may comprise any one or more of load sensors, potentiometers, strain gauges, capacitive sensors, piezoresistive or piezoelectric sensors, or any other types of sensors that are capable of detecting forces applied by the operator to the patient transport apparatus 30. In some embodiments, the force sensors 156 will be configured to detect forces applied in two mutually orthogonal, generally horizontal directions. That is, for example, the force sensors 156 will be configured to detect forces that have a component parallel to the longitudinal extent of the patient transport apparatus 30 (head end to foot end), as well as forces that have a component parallel to the lateral extent of the patient transport apparatus 30 (side to side). In this manner, control of the patient transport apparatus 30 can be coordinated to match or align with not only the forward to backward forces exerted on the patient transport apparatus 30, but also horizontal forces that are transverse or oblique to the longitudinal axis L of the patient transport apparatus 30.

The force sensors 156 are arranged or configured so as to detect any and all force components that are applied in generally any horizontal orientation, or that have any horizontal components to them. More specifically, the force sensors 156 are arranged to detect forces that are generally parallel to the horizontal plane defined by the base 34 of the patient transport apparatus 30, or the horizontal plane defined by the wheels 58, 60, 62, 64 of the patient transport apparatus 30 (which may not be parallel to a true horizontal plane if the patient transport apparatus 30 is positioned on an incline or decline, or other uneven ground). That is, the force sensors 156 are able to detect forces in both a lateral direction and a longitudinal direction. Force components that are vertically oriented with respect to either of these planes may, in general, be ignored or not sensed by the force sensors 156, or may be used for other purposes.

In certain configurations, the force sensors 156 communicate with the controller 152 to not only determine the magnitude of forces applied, but also the direction(s) of those forces. The reference to "direction" of forces herein may mean whether the force was applied in a forward or backward direction or may mean more than determining whether a force was applied in a forward or backward direction. In other words, the force sensors 156 may communicate with the controller 152 to determine the direction of applied force in generally all horizontal, or approximately horizontal, directions. That is, the force sensors 156 can be used to detect any angular orientation, from 0 to 360 degrees, about a generally vertical axis.

FIGS. 15-17 provide several illustrative examples of different configurations and locations of the force sensors 156. It will be understood that the several examples illustrated in these figures are not exhaustive, and that variations from these configurations may be made. Further, activation and deactivation of any of the force sensors 156 could be controlled by the controller 152.

FIG. 15 schematically illustrates the intermediate frame 36 of the patient transport apparatus 30 as well as the side rails 44, 46, 48, 50, headboard 52, and footboard 54, which are attached thereto. Each of the side rails 44, 46, 48, 50, headboard 52, and footboard 54 are coupled to the intermediate frame 36 by a pair of the force sensors 156. In some embodiments, the force sensors 156 provide physical coupling of these components to the intermediate frame 36, while in other embodiments the force sensors 156 are coupled to one or more separate structures that physically secure these components to the intermediate frame 36. However arranged, the force sensors 156 are coupled in a manner so that forces applied by the operator on any of the side rails 44, 46, 48, 50, headboard 52, and footboard 54 are detected by one or both of the force sensors 156 that are positioned at the junction of that particular component. Thus, for example, if the operator pushes or pulls anywhere on the footboard 54, comprising, but not limited to, any one or more of locations A, B, and/or C, this pushing or pulling force will be detected by the force sensors 156 positioned at the junction of the footboard 54 and the intermediate frame 36. Further, any or all of the force sensors 156 may be constructed so as to be able to detect forces applied both in a longitudinal direction 160 as well as a lateral direction 158, although this is not necessary. For instance, the force sensors 156 may be force/torque sensors that are capable of measuring forces/torques in three translational degrees of freedom and three rotational degrees of freedom.

Additional information that may be used by the controller 152 to determine the appropriate control of the brake mechanisms 61, the steer-lock mechanisms 63, and/or the pre-swivel mechanisms 65, other than the direction and magnitude of the forces applied to each force sensor 156, is the relative location of each force sensor 156 that is sensing a force. These relative locations are defined with respect to a reference location 162, which may be chosen by the manufacturer of the patient transport apparatus 30. In some embodiments, the reference location 162 is the geometrical center of the patient transport apparatus 30, while in other embodiments the reference location 162 is a vertical axis aligned with the center of gravity or center of mass of the patient transport apparatus 30. In still other embodiments, other reference locations are used.

In one embodiment, shown in FIG. 15 for example, if the operator pushes forward on the footboard 54 only at location C, most of this force will be sensed by the force sensor 156 adjacent to location C. A small amount of this forward force may also be detected by the force sensor 156 adjacent location A, depending upon the construction of the footboard 54 and its connection to the intermediate frame 36. Regardless of what the force sensor 156 near location A senses, however, the predominant force will be sensed in a forward direction at a location that is located to the right of the reference location 162 (e.g., a center) of the patient transport apparatus 30. Accordingly, the controller 152 will determine that the operator desires to turn the patient transport apparatus 30 leftward and will control the brake mechanisms 61, the steer-lock mechanisms 63, and/or the pre-swivel mechanisms 65 accordingly. This is because a forward force applied at location C that was greater than any forward force applied at any other location on the footboard 54 to the left of the reference location 162 would naturally tend to turn patient transport apparatus 30 leftward. Thus, the controller 152 takes into account not only the direction and magnitudes of forces sensed by the force sensors 156, but also takes into account where each of those force sensors 156 are located relative to the reference location 162. Stated in another way, the controller 152 is configured to take into account the amount of torque that is applied by the sum of the sensed forces about a generally vertical axis, such as one running through the reference location 162, or some other point, and control the brake mechanisms 61, the steer-lock mechanisms 63, and/or the pre-swivel mechanisms 65 in a manner based on this sensed torque.

The controller 152 may take into account the relative location of the applied forces by retrieving from a memory on board the patient transport apparatus 30 the location or locations of the one or more force sensors 156 that are currently detecting applied forces. These locations are defined in a coordinate frame of reference that has its origin located at the reference location 162 so that no additional calculations of the sensor's location relative to the reference location 162 need to be made.

In other embodiments, the force sensors 156 are mounted on the faces of the side rails 44, 46, 48, 50, headboard 52, and/or footboard 54, rather than at the interface or junction of these components and the intermediate frame 36. When so mounted, the operator can apply force directly to the force sensor 156, and forces applied to other locations would not be detected.

In FIG. 16, the configuration of the force sensors 156 are different from the configuration of FIG. 15. In this embodiment, there are two force sensors 156, both of which are capable of detecting forces in both the lateral direction 158 and the longitudinal direction 160. The force sensors 156 are located at junctions of the intermediate frame 36 and each of two height adjustment mechanisms 144, such as column lift mechanisms. By positioning the force sensors 156 in this location, any forces that are applied in either the lateral direction 158 or the longitudinal direction 160 on the intermediate frame 36 will be detected by one or both of the force sensors 156. In other words, when the operator applies a generally horizontal force on any portion of the intermediate frame 36, comprising anything attached directly to the intermediate frame 36 (such as the side rails 44, 46, 48, 50, headboard 52, and/or footboard 54), that force will be transmitted to one or both of the height adjustment mechanisms 144, which support the intermediate frame 36. However, because the force sensors 156 are positioned at the junction of the intermediate frame 36 and these height adjustment mechanisms 144, the force sensors 156 will sense these forces.

As with the configuration of FIG. 15, the controller 152 may take into account—in addition to the direction and magnitude of forces sensed by the force sensors 156—the location of the force sensors 156 relative to the reference location 162 on the patient transport apparatus 30, such as, but not limited to, the center of the patient transport apparatus 30. Thus, if the two force sensors 156 were asymmetrically positioned around the reference location 162, the detection of forces on both the force sensors 156 of equal magnitude and direction would result in a torque being applied with respect to the reference location 162. The controller 156 may be programmed to take into account such torque when determining how to control the brake mechanisms 61, the steer-lock mechanisms 63, and/or the pre-swivel mechanisms 65.

FIG. 17 illustrates another possible configuration of the force sensors 156. In this embodiment, the force sensors 156 are integrated into, or coupled to, the caster assemblies 66, or mounted between the caster assemblies 66 and the base 34. The force sensors 156 in FIG. 17 are configured to detect forces in both the lateral and longitudinal directions 158 and 160, respectively. These forces are forwarded to the controller 152 which processes them in the same manner previously described. As with the configurations of FIGS. 15 and 16, the controller 152 for the patient transport apparatus 30 takes into account the location of the force sensors 156 relative to the reference location 162 when controlling the brake mechanisms 61, the steer-lock mechanisms 63, and/or the pre-swivel mechanisms 65.

FIGS. 15-17 illustrate several embodiments where there are several control locations available to one or more operators to control the patient transport apparatus 30. These control locations may comprise a head end control location, a foot end control location, a right side head location, a right side foot location, a left side head location, a left side foot location, or other suitable locations. The operator may stand in any of these various locations and apply a force on the intermediate frame 36, side rails 44, 46, 48, 50, headboard 52, and/or footboard 54. These applied forces will then control, via the controller 152, the brake mechanisms 61, the steer-lock mechanisms 63, and/or the pre-swivel mechanisms 65. By having multiple control locations, it is easier for the operator to effectuate movement of the patient transport apparatus 30 because he or she does not need to physically move to a single dedicated location to cause such movement. This feature can be especially useful where an end or side (or both) of the patient transport apparatus 30 is positioned up against a wall, or other obstacle, and the operator cannot easily stand next to the portion of the patient transport apparatus 30 adjacent the obstacle. By having multiple control locations, however, the operator is assured that control of the brake mechanisms 61, the steer-lock mechanisms 63, and/or the pre-swivel mechanisms 65 can be carried out in any convenient location. The location of the force sensors 156 may be the same as in any of FIGS. 15-17, or they may comprise still other force sensor locations and configurations.

The sensing of forces by the force sensors 156 may be carried out repetitively and/or continuously during the movement of the patient transport apparatus 30. In some embodiments, this sensing of forces is performed multiple times per second. The information from the repetitive sensor readings is continuously or repetitively forwarded to the controller 152 in order to adjust, as necessary, the commands issued to one or more of the brake actuators 105, the steer-lock actuators 122, and/or the pre-swivel actuators 132. In this manner, the response to changing forces, as sensed by the force sensors 156, is updated many times a second so that the patient transport apparatus 30 will respond to changing applied forces. For instance, when an operator desires to move the patient transport apparatus 30 from a stationary state in any path other than a straight path, continuous detection of the changing forces can continuously update the desired direction of movement such that the pre-swivel actuators 132 can be continuously controlled to reorient the wheels 58, 60, 62, 64 into orientations suitable for such a desired path of movement. In some embodiments, the movement of patient transport apparatus 30 is a closed loop control system based on the force inputs, while in other embodiments the control is open loop. The force sensors 156 may be positioned anywhere on the patient transport apparatus 30 that forces applied by the operator can be detected.

Other inputs into the controller 152 can affect control of the brake mechanisms 61, the steer-lock mechanisms 63, and/or the pre-swivel mechanisms 65. These other inputs may represent conditions of the patient transport apparatus 30.

One such condition monitored by the controller 152 relates to the status of the brake mechanisms 61 and/or manual brakes (if manual brakes are used in addition to, or in lieu of, the electrically-operated brake mechanisms 61). More specifically, this condition relates to whether the brake mechanisms 61 or the manual brakes are in the braked or unbraked mode. In monitoring this condition, the controller 152 may prevent actuation of the steer-lock mechanisms 63 and the pre-swivel mechanisms 65 if the controller 152 determines that the brake mechanisms 61 or the manual brakes are in the braked mode. For instance, when the brake mechanisms 61 or the manual brakes are in the braked mode, the operator's manipulation of the force sensors 156 may not result in any operation of the steer-lock mechanisms 61 and/or the pre-swivel mechanisms 65. Once the brake mechanisms 61 or the manual brakes are in the unbraked mode, however, then the operator's manipulation of the force sensors 156 or other user input device can cause the controller 152 to activate one or more of the steer-lock mechanisms 63 and/or the pre-swivel mechanisms 65 in a desired manner, assuming no other conditions exist that would prevent this operation. Alternatively, when brake mechanisms 61 or the manual brakes are sensed to be in the unbraked mode, the controller 152 may cause automatic operation of one or more of the steer-lock mechanisms 63 and/or the pre-swivel mechanisms 65 in response to detecting a force applied to the patient transport apparatus 30 by the operator.

The brake sensors 147 are in communication with the controller 152 to determine whether the brake mechanisms 61 or the manual brakes are in the braked or unbraked mode. The brake sensors 147 provide input signals to the controller 152 indicative of whether the brake mechanisms 61 or the manual brakes are in the braked or unbraked mode.

In the embodiment with manual brakes, the manual brakes may be actuated by a brake pedal (not shown). The brake pedal is manipulated by the operator between braked and unbraked configurations to move the manual brakes between the braked and unbraked modes. The brake sensor 147 (see FIG. 12), in this embodiment, may comprise a switch arranged relative to the brake pedal to close when the brake pedal is moved by the operator to place the manual brakes in the unbraked mode and to open when the brake pedal is moved by the operator to place the manual brakes in the braked mode. Other configurations of the brake sensor 147 are also contemplated. It should be appreciated that a variety of brakes may be used in conjunction with the patient transport apparatus 30 described herein, including manual, electric, or magnetic braking systems.

In some cases, actuation of the brakes to the unbraked mode triggers the brake sensor 147 to transmit an input signal to the controller 152. In some cases, the controller 152 responds by automatically activating the pre-swivel mechanisms 65 to move the wheels 58, 60, 62, 64 to a predetermined orientation. The predetermined orientation may be a trailing orientation based on movement of the patient transport apparatus 30 being in a longitudinal direction and led by the foot end. Other predetermined orientations are also possible. Similarly, actuation of the brakes to the braked mode may cause the controller 152 to automatically place the steer-lock mechanisms 63 in the free-swivel mode.

Another condition monitored by the controller 152 relates to the status of the steer-lock mechanisms 63. More specifically, this condition relates to whether the steer-lock mechanisms 63 are in the free-swivel mode or the steer mode. In monitoring this condition, the controller 152 may prevent actuation of one or more of the pre-swivel mechanisms 65 if the controller 152 determines that one or more of the steer-lock mechanisms 63 are in the steer mode. For example, if the pre-swivel mechanism 65 was actuated with the steer-lock mechanism 63 in the steer mode, the pre-swivel mechanism 65 would be unable to easily swivel the wheel 58 and may damage the steer-lock mechanism 63 or the pre-swivel mechanism 65. This condition can be monitored simply by tracking actuation of the steer-lock actuators 122 or could be monitored by any suitable sensor on the steer-lock actuators 122, such as an encoder, Hall-effect sensor, and the like.

Another condition monitored by the controller 152 relates to the status of the pre-swivel mechanisms 65. More specifically, this condition relates to whether the pre-swivel mechanisms 65 are in the pre-swivel mode or the rest mode. In monitoring this condition, the controller 152 may prevent actuation of the steer-lock mechanisms 63 if the controller 152 determines that the pre-swivel mechanisms 65 are in the pre-swivel mode. In this case, the controller 152 may delay placing the steer-lock mechanisms 63 in the steer mode until the pre-swivel mechanisms 65 are back in the rest mode, i.e., the pre-swivel mechanisms 65 have completed moving their wheels to the trailing orientation. This condition can be monitored simply by tracking actuation of the pre-swivel actuators 132 or could be monitored by any suitable sensor on the pre-swivel actuators 132, such as an encoder, Hall-effect sensor, and the like.

Another condition of the patient transport apparatus 30 relates to whether the patient transport apparatus 30 is connected to the external power source 330. A power detector 157 (see FIG. 12) provides an operational input into the controller 152 used to determine if the patient transport apparatus 30 is connected to (e.g., plugged into) the external power source 330 and/or receiving AC power. Connection to the external power source 330 is an indication that the patient transport apparatus 30 is likely to be stationary for a prolonged period of time. Other configurations of the power detector 157 are contemplated, such as a power detection circuit.

Connection to the external power source 330 may cause the controller 152 to automatically place the brake mechanisms 61 in the braked mode. This external power condition may have priority over other conditions and prevent the controller 152 from placing the brake mechanisms 61 in the unbraked mode and prevent actuation of the steer-lock mechanisms 63 or the pre-swivel mechanisms 65. For instance, when the patient transport apparatus 30 is connected to the external power source 330, the operator's manipulation of the force sensors 156, or other types of user input devices, will not result in any operation of the brake mechanisms 61, steer-lock mechanisms 63, or pre-swivel mechanisms 65.

When the patient transport apparatus 30 is disconnected from the external power source 330, as detected by the controller 152, the operator's manipulation of the force sensors 156 or other user input device can cause the controller 152 to activate one or more of the brake mechanisms 61, the steer-lock mechanisms 63, and/or the pre-swivel mechanisms 65 in a desired manner, assuming no other conditions exist that would prevent this operation. Disconnection from the external power source 330 is an indication that the patient transport apparatus 30 is being readied for movement by the operator and the patient transport apparatus 30 could be prepared accordingly. Thus, in some embodiments, the controller 152 detects the moment that the patient transport apparatus 30 is disconnected from the external power source 330 and automatically places all the brake mechanisms 61 in the unbraked mode and keeps/places all the steer-lock mechanisms 63 in the free-swivel mode.

External conditions around the patient transport apparatus 30 may also be used as criteria evaluated by the controller 152 to determine proper control of the brake mechanisms 61, the steer-lock mechanisms 63, and/or the pre-swivel mechanisms 65. For instance, control may be based on whether the patient transport apparatus 30 is in a hospital room or a hallway. In a hospital room, for example, it may be unnecessary to activate the steer-lock mechanisms 63, but they could be activated in the hallway. Such external conditions may be determined by sensors such as optical sensors, ultrasonic sensors, infrared sensors, or any other suitable sensors.

In some embodiments, a user interface 164 (see FIG. 12) may be provided for user input. The user interface 164 may also allow customization of the conditions and priority of conditions for operation of the brake mechanisms 61, the steer-lock mechanisms 63, and/or the pre-swivel mechanisms 65. The user interface 164 may comprise buttons, voice activation, gesture sensors, remote control, hand levers, foot pedals, brake pedals, other suitable user input devices, or combinations thereof. The user interface 164 may be mounted to the headboard 52, footboard 54, side rails 44, 46, 48, 50, or any other suitable location on the patient transport apparatus 30. The user interface 164 may also be located remotely from the patient transport apparatus 30.

The user interface 164 may comprise a touch screen having touch-selectable buttons that can be selected by the operator to place the patient transport apparatus 30 in a desired mobility configuration. For instance, the user interface 164 may have four selections available using a single touch-selectable button or multiple touch-selectable buttons. These selections could be identified with indicia or graphical representations as "brake," "steer," "free," and "pre-swivel." The "brake" selection places all the brake mechanisms 61 in the braked mode, keeps the steer-lock mechanisms 63 is their current mode, and places all the pre-swivel mechanisms 65 in the rest mode. In other embodiments, all the steer-lock mechanisms 63 may be placed in the free-swivel mode or in the steer mode. The "steer" selection places all the brake mechanisms 61 in the unbraked mode, desired steer-lock mechanisms 63 in the steer mode, and all the pre-swivel mechanisms 65 in the rest mode. The "free" selection places all the brake mechanism 61 in the unbraked mode, all the steer-lock mechanisms 63 in the free-swivel mode, and all the pre-swivel mechanisms 65 in the rest mode. The "pre-swivel" selection places all the brake mechanisms 61 in the unbraked mode, all the steer-lock mechanisms 63 in the free-swivel mode, and any necessary pre-swivel mechanisms 65 in the pre-swivel mode based on a user-indicated direction of desired movement. Other mobility configurations and associated inputs are also contemplated.

The user interface 164 may comprise one or more buttons or other user input devices for the operator to indicate which direction the operator intends to move the patient transport apparatus 30, i.e., the direction of desired movement of the patient transport apparatus 30. This could be as simple as the touch screen having touch-selectable buttons corresponding to each of the longitudinal and lateral directions of the bed, namely forward, backward, left, and right (as observed when at the user interface 164 such as when the user interface 164 is located on the headboard 52). By actuating one of the buttons, the controller 152 transmits control signals to the pre-swivel actuators 132 to place the pre-swivel mechanisms 65 in the pre-swivel mode and swivel (i.e., re-orient) the wheels 58, 60, 62, 64 to their trailing orientations with respect to the direction of desired movement. The controller 152 then transmits another control signal to the appropriate steer-lock actuators 122 based on the direction of desired movement which places the appropriate steer-lock mechanisms 63 in the steer mode (such as only the steer-lock mechanisms 63 at the foot end).

In general, the controller 152 coordinates the operation of one or more of the brake mechanisms 61, the steer-lock mechanisms 63, and/or the pre-swivel mechanism 65 based upon information received from user input devices, such as from one or more of the force sensors 156, the user interface 164, or other user input devices, and from operational input devices, such as the position sensors 146, the brake sensors 147, the motion sensors 148, the torque sensors 149, the power detector 157, or other operational input devices. More specifically, the controller 152 receives input signals from these input devices, analyzes the input signals, and outputs one or more control signals to the brake actuators 105, the steer-lock actuators 122, and/or the pre-swivel actuators 132 that cause the brake mechanisms 61, the steer-lock mechanisms 63, and/or the pre-swivel mechanisms 65 to operate in a manner that helps to move the patient transport apparatus 30 in the manner desired by the operator or to keep the patient transport apparatus 30 stationary, if needed. Other sensors could also be used to control operation of the brake mechanisms 61, the steer-lock mechanisms 63, and/or the pre-swivel mechanisms 65 including, for example, optical sensors, ultrasonic sensors, infrared sensors, or any other sensors capable of detecting any of the conditions described herein. Control of the brake mechanisms 61, the steer-lock mechanisms 63, and/or the pre-swivel mechanisms 65 can be independent, or dependent upon each other.

Referring to the flow diagrams in FIGS. 18 and 19, exemplary methods of operation of the steer-lock mechanisms 63 and the pre-swivel mechanisms 65 are illustrated.

FIG. 18 is a flow diagram of steps for a method of automatically controlling the steer-lock mechanism 63. In step 170, the method comprises detecting the force applied by the operator to the patient transport apparatus 30 with the force sensing system 154. The force can be detected from one or more locations on the patient transport apparatus 30, basically anywhere on the patient transport apparatus 30 that the operator may push to initiate movement of the patient transport apparatus 30. In step 172, an input signal for the controller 152 is generated based on the force that is detected. The input signal is then transmitted to the controller 152 to be processed by the controller 152.

In step 174, desired movement of the patient transport apparatus 30 can then be determined by the controller 152 based on the input signal. This may comprise determining a direction of desired movement of the patient transport apparatus 30. In step 176, the steer-lock mechanism 63 is placed in the free-swivel mode or the steer mode based on the desired movement of the patient transport apparatus 30. This may comprise a slight delay to allow for all the wheels 58, 60, 62, 64 to reach their trailing orientations (or be placed in their trailing orientations by the pre-swivel mechanisms 65) so that the appropriate steer-lock position is set. For instance, when the controller 152 determines that the operator wishes to move the patient transport apparatus 30 by pushing the headboard 52, with the foot end of the patient transport apparatus 30 leading the movement, then the two steer-lock mechanisms 63 on the caster assemblies 66 at the foot end are placed in the steer mode once their wheels 58, 60 are near their trailing orientations so that the locking elements 126 engage the appropriate catches 128.

FIG. 19 is a flow diagram of steps for a method of reducing the start-up force necessary to initiate movement of the patient transport apparatus 30 by the operator using the pre-swivel mechanism 65. In step 180, the method comprises detecting an input signal generated by the input device. The input signal may be generated by one of the aforementioned user input devices or other type of input device that provides input to the controller 152, such as one or more of the aforementioned sensors.

In step 182, the pre-swivel mechanism 65 is actuated based on the input signal generated by the input device to swivel at least one of the wheels 58, 60, 62, 64 about the swivel axis S from the non-trailing orientation to the trailing orientation relative to a direction of desired movement of the patient transport apparatus 30. This moves one of the wheels 58, 60, 62, 64 to change the orientation by at least some amount, such as by at least 1 degree of swiveling. In some cases, this comprises changing the orientation from the leading orientation to the trailing orientation based on the direction of desired movement.

Figure 20A:
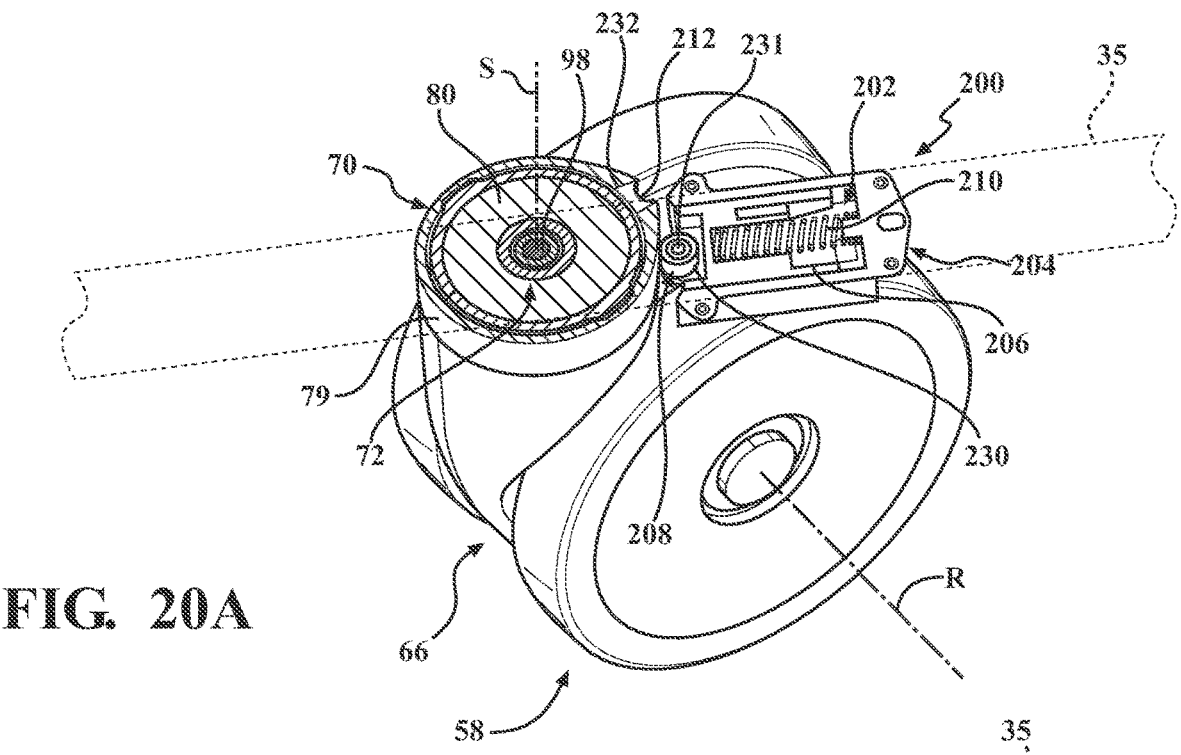
FIGS. 20A and 20B are perspective views of an automatic steer-lock mechanism in the free-swivel mode and the steer mode, respectively.
Figure 20B:
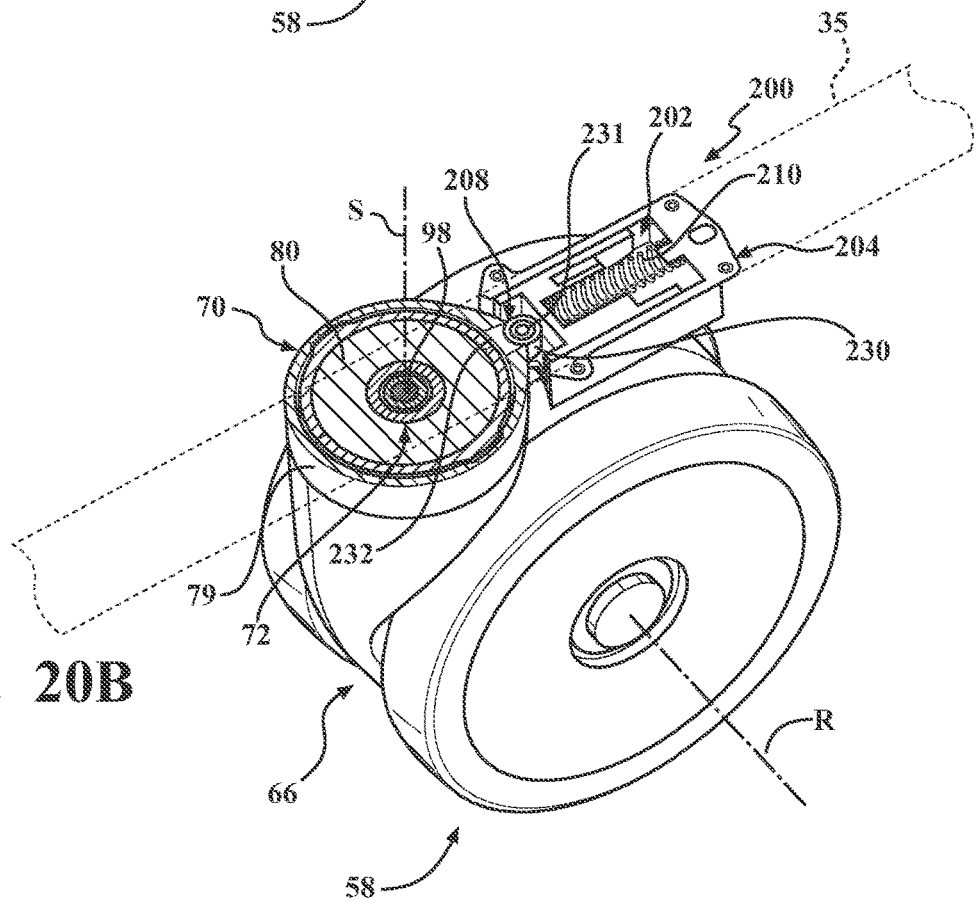

Referring to FIGS. 20A and 20B, an automatic steer-lock mechanism 200 is shown. The patient transport apparatus 30 may optionally comprise the automatic steer-lock mechanism 200 in certain embodiments. This automatic steer-lock mechanism 200 is applied without requiring any operator interaction to place the automatic steer-lock mechanism 200 in the steer mode. This may be advantageous since operators often forget to engage manually-actuated steer-lock mechanisms. Even more problematic is when the operator forgets to disengage the steer-lock mechanism. In such a case, when the operator tries to laterally move the patient transport apparatus 30, the patient transport apparatus 30 is difficult to move and the operator believes the brakes are still engaged, causing confusion and frustration. The need for mechanical linkages throughout the base 34 to connect to the automatic steer-lock mechanism 200 could also be eliminated in the embodiment shown. The automatic steer-lock mechanism 200 shown is a purely mechanically-actuated mechanism, but could be electrically-actuated, or electro-mechanically actuated.

The automatic steer-lock mechanism 200 can be used as a substitute for the steer-lock mechanism 63 shown in FIGS. 8A and 8B. Like the steer-lock mechanism 63, the automatic steer-lock mechanism 200 also operates in a free-swivel mode and a steer mode. In the free-swivel mode, the wheel support 70 and associated wheel 58 are permitted to freely swivel about the swivel axis S. In the steer mode, the wheel support 70 and associated wheel 58 are prevented from freely swiveling about the swivel axis S.

In this embodiment, instead of the locking element 126, a detent assembly 202 is employed to provide the steer lock. A housing 204 is mounted to the spindle 72 in the same manner as the housing 124 shown in FIG. 8A. The detent assembly 202 is arranged to slide in the housing 204. The detent assembly 202 comprises a detent carrier 206. The detent carrier 206 is slidable in the housing 204 and comprises a post 231 that supports a detent 208. In the embodiment shown, the detent 208 is a roller, but can be any form of detent such as a ball detent. The detent 208 may comprise a resilient material that may provide additional dampening to the automatic steer-lock mechanism 200.

A detent pocket 212 is formed in the cap 79 of the wheel support 70. In the version shown, the cap 79 has a radially-enlarged portion on one side in which the detent pocket 212 is formed so that as the wheel 58 is swiveling toward the trailing orientation (FIG. 20B), the detent rolls along the radially-enlarged portion to reach the detent pocket 212. Only one detent pocket 212 is shown, but two or more detent pockets 212 are possible, such as two detent pockets 212 circumferentially separated 180 degrees apart like the catches 128 shown in FIG. 8B. Alternative shapes and configurations of the detent 208 and detent pocket 212 may also be utilized.

A biasing device 210 biases the detent carrier 206 so that the detent 208 is urged into engagement with the cap 79. The biasing device 210 biases the detent 208 in a radial direction perpendicular to the swivel axis S. The biasing device 210 shown comprises a compression spring acting between the housing 204 and the detent carrier 206.

During operation, as the wheel 58 moves from the non-trailing orientation (FIG. 20A) to the trailing orientation (FIG. 20B), the detent 208 rolls along the outer surface of the cap 79 under the bias of the biasing device 210. Once the wheel 58 reaches the trailing orientation, the detent 208 automatically falls into the detent pocket 212 under the bias of the biasing device 210. Locating the detent 208 in the detent pocket 212 provides temporary steer locking of the wheel 58.

The detent assembly 202 is biased, such as spring-biased, so that when enough force is applied laterally to the patient transport apparatus 30, the detent 208 pops out of the detent pocket 212, allowing the wheel 58 to swivel about the swivel axis S and the patient transport apparatus 30 to be moved laterally. Also, if a second operator is helping to steer the patient transport apparatus 30 at the foot end, the lateral forces may be enough to overcome the bias exerted on the detent assembly 202. In other words, the automatic steer-lock mechanism 200 automatically switches from the steer mode to the free-swivel mode if a torque exceeding a predetermined threshold is applied to the wheel 58.

In this embodiment, no actuator is required to cause activation or deactivation of the automatic steer-lock mechanism 200. Thus, no operator interaction is required and no cable or linkage needs to be routed through the base 34 for the automatic steer-lock mechanism 200.

In another embodiment, the automatic steer-lock mechanism 200 can be optionally enhanced with additional engagement members. In this embodiment, a first engagement member 230 is coupled to the spindle 72 by virtue of being supported in the housing 204. In the version shown, the first engagement member 230 comprises part of the detent 208. A second engagement member 232 is coupled to the wheel support 70. The first and second engagement members 230, 232 are configured to interact with one another to prevent the wheel support 70 from freely swiveling about the swivel axis S when the automatic steer-lock mechanism 200 is in the steer mode.

In one version of this embodiment, one of the first and second engagement members 230, 232 comprises a magnet. The other of the first and the second engagement members 230, 232 comprises a ferromagnetic material or a second magnet. In the version shown, the first engagement member 230 comprises a cylindrically-shaped magnet mounted about the post 231. Thus, the first engagement member 230 forms part of detent 208. The second engagement member 232 is mounted to the wheel support 70 adjacent to the detent pocket 212. In the version shown, the second engagement member 232 is a portion of ferromagnetic material, such as a block of ferromagnetic material embedded in the cap 79. The magnet may comprise neodymium or may be an electromagnet. Accordingly, the automatic steer-lock mechanism 200 effectively becomes a magnetic steer-lock mechanism in this embodiment. The magnet and ferromagnetic material enhance locking in the steer mode by providing an additional magnetic force to hold the wheel 58 in the desired orientation in the steer mode, such as the trailing orientation shown in FIG. 20B. It should be appreciated that other configurations of the magnetic steer-lock mechanism are also contemplated, where the magnet is positioned at alternative locations within the steer-lock mechanism 63.

Figure 21A:
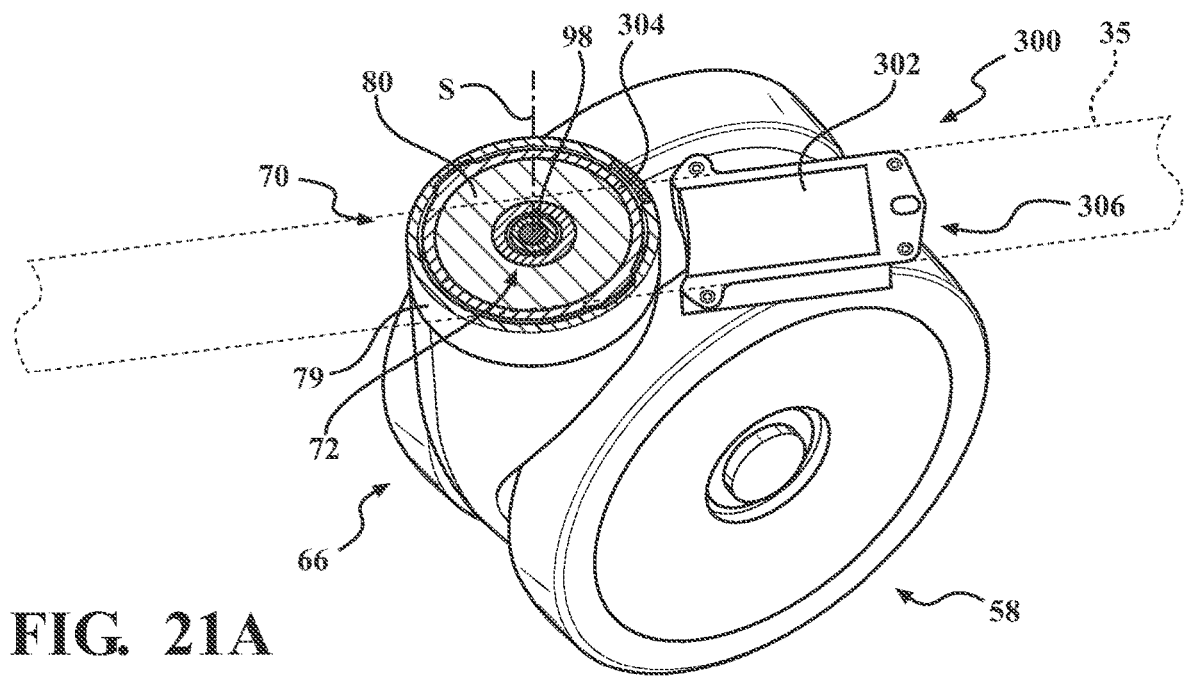
FIGS. 21A and 21B are top views of a non-contact steer-lock mechanism in the free-swivel mode and the steer mode, respectively.
Figure 21B:
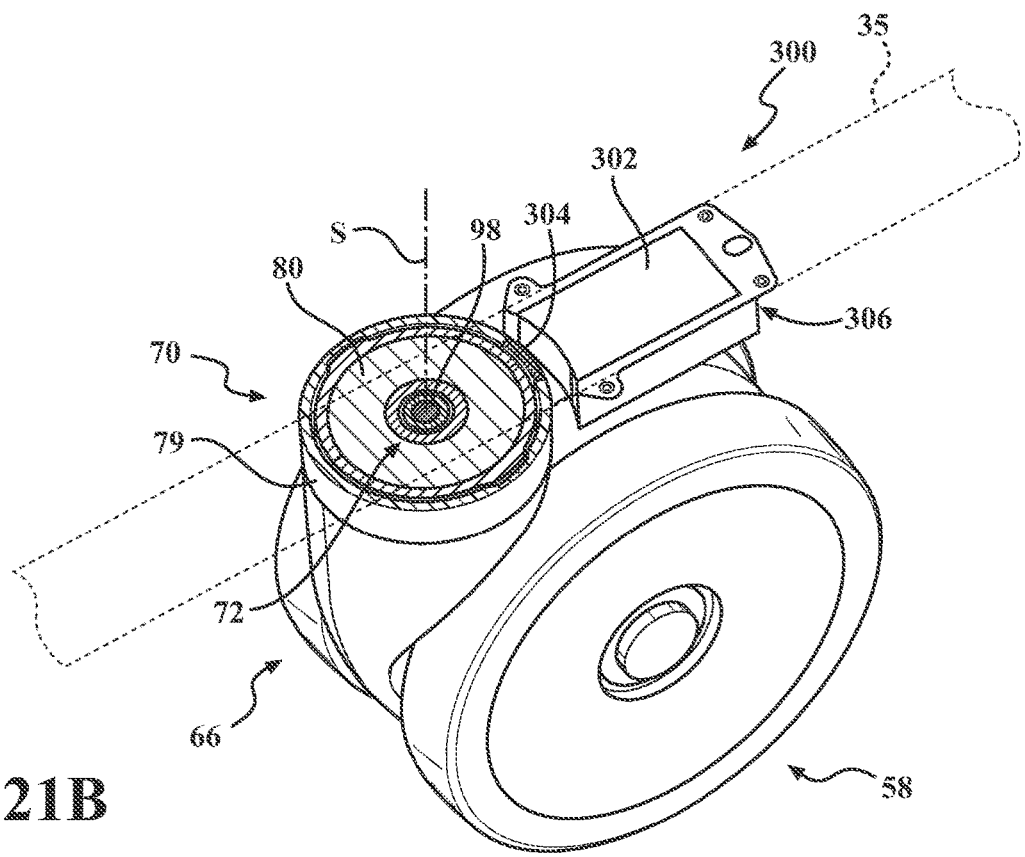

Referring to FIGS. 21A and 21B, a non-contact steer-lock mechanism 300 is shown. The non-contact steer-lock mechanism 300 can also be used as substitute for the steer-lock mechanism 63 shown in FIGS. 8A and 8B. The non-contact steer-lock mechanism 300 operates in a free-swivel mode and a steer mode. In the free-swivel mode, the wheel support 70 and wheel 58 are permitted to freely swivel about the swivel axis S. In the steer mode, the wheel is prevented from freely swiveling about the swivel axis S. More specifically, the wheel support is prevented from freely swiveling about the swivel axis S relative to the connector 73 without physical contact when the non-contact steer-lock mechanism 300 is in the steer mode.

The non-contact steer-lock mechanism 300 comprises a first non-contact member 302. A housing 306 is mounted to the spindle 72 in the same manner as housing 124 shown in FIG. 8A. The first non-contact member 302 is disposed in the housing 306 and thus coupled to the spindle 72. The first non-contact member 302 is fully supported by the housing 306.

The non-contact steer-lock mechanism 300 also comprises a second non-contact member 304. The second non-contact member 304 is coupled to the cap 79 of the wheel support 70. In the version shown, the second non-contact member 304 rotates with the wheel support 70 and associated wheel 58 relative to the first non-contact member 302 in the free-swivel mode. The first and second non-contact members 302, 304 are configured to interact with one another without physical contact to prevent the wheel support 70 from freely swiveling about the swivel axis S when the non-contact steer-lock mechanism 300 is in the steer mode. In other words, in certain embodiments, at no point during the operation of the non-contact steer lock mechanism 300 do the first and second non-contact members 302, 304 physically contact one another.

In one embodiment, one of the first and second non-contact members 302, 304 comprises a magnet. The other of the first and second non-contact members 302, 304 comprises a ferromagnetic material. The magnet exerts a magnetic force on the ferromagnetic material in the steer mode. In one version, the magnet comprises an electromagnet. For instance, the first non-contact member 302 may be an electromagnet controlled by the controller 152 in the same manner as the steer-lock actuator 122. In another version, the magnet comprises a neodymium magnet.

In some cases, magnetic attraction is experienced between the first and second non-contact members 302, 304 in both the steer mode and the free-swivel mode. For instance, the magnet may exert a first magnetic force on the ferromagnetic material in the steer mode and a second magnetic force on the ferromagnetic material in the free-swivel mode. However, the second magnetic force is smaller than the first magnetic force since the magnetic forces are smaller when the magnet and ferromagnetic material are separated by greater distance in the free-swivel mode than in the steer mode. For that reason, the wheels 58, 60, 62, 64 are still considered to be freely swiveling in the free-swivel mode even though under some magnetic attraction forces.

In another embodiment, the first non-contact member 302 comprises a first magnet and the second non-contact member 304 comprises a second magnet. In this embodiment, the magnets are arranged with their poles aligned to attract in the steer mode.

During operation, as the wheel 58 moves from the non-trailing orientation (FIG. 21A) to the trailing orientation (FIG. 21B), the second non-contact member 304 swivels toward the first non-contact member 302 as the wheel 58 transitions to the trailing orientation. Once the wheel 58 reaches the trailing orientation, the second non-contact member 304 automatically aligns with the first non-contact member 302. Attractive forces between the first and second non-contact members 302, 304, when aligned, provides temporary steer locking of the wheel 58.

The non-contact steer-lock mechanism 300 is configured to automatically switch from the steer mode to the free-swivel mode if a torque exceeding a predetermined threshold is applied to the wheel 58. In the version shown, the non-contact steer-lock mechanism 300 acts through magnetic attraction in the steer mode so that when enough force is applied laterally to the patient transport apparatus 30, the magnetic attraction is overcome, allowing the wheel 58 to swivel about the swivel axis S and the patient transport apparatus 30 to be moved laterally. Also, if a second operator is helping to steer the patient transport apparatus 30 at the foot end, the lateral forces may be enough to overcome the magnetic attraction. In this embodiment, no actuator is required to cause activation or deactivation of the non-contact steer-lock mechanism 300. Thus, no operator interaction is required and no cable or linkage needs to be routed through the base 34 for the non-contact steer-lock mechanism 300. The strength and orientation of the first and second non-contact members 302, 304 may be adjusted depending on the desired operation of the non-contact steer-lock mechanism 300. For example, a weaker magnet may be used in the first non-contact member 302 should it be desired that the patient transport apparatus 30 be easily moved in a lateral direction.

Figure 22:
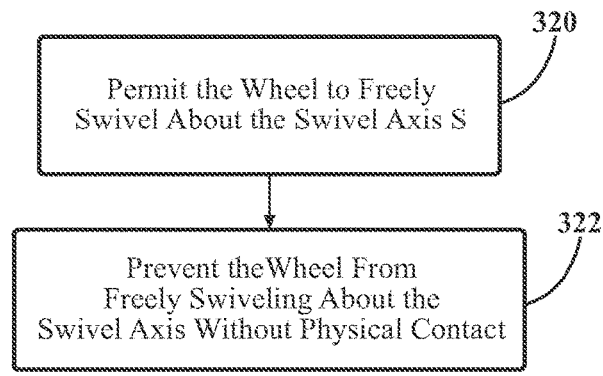
FIG. 22 is a flow diagram of steps for a method for aiding movement of the patient transport apparatus using the non-contact steer-lock mechanism.

Referring to FIG. 22, a method for aiding movement of the patient transport apparatus 30 using the non-contact steer-lock mechanism 300 is illustrated. In step 320, the method comprises permitting the wheel 58 to freely swivel about the swivel axis S relative to the connector 73 when the non-contact steer-lock mechanism 300 is in the free-swivel mode. In step 322, the wheel 58 is prevented from freely swiveling about the swivel axis S relative to the connector 73 without physical contact when the non-contact steer-lock mechanism 300 is in the steer mode.

Figure 23:
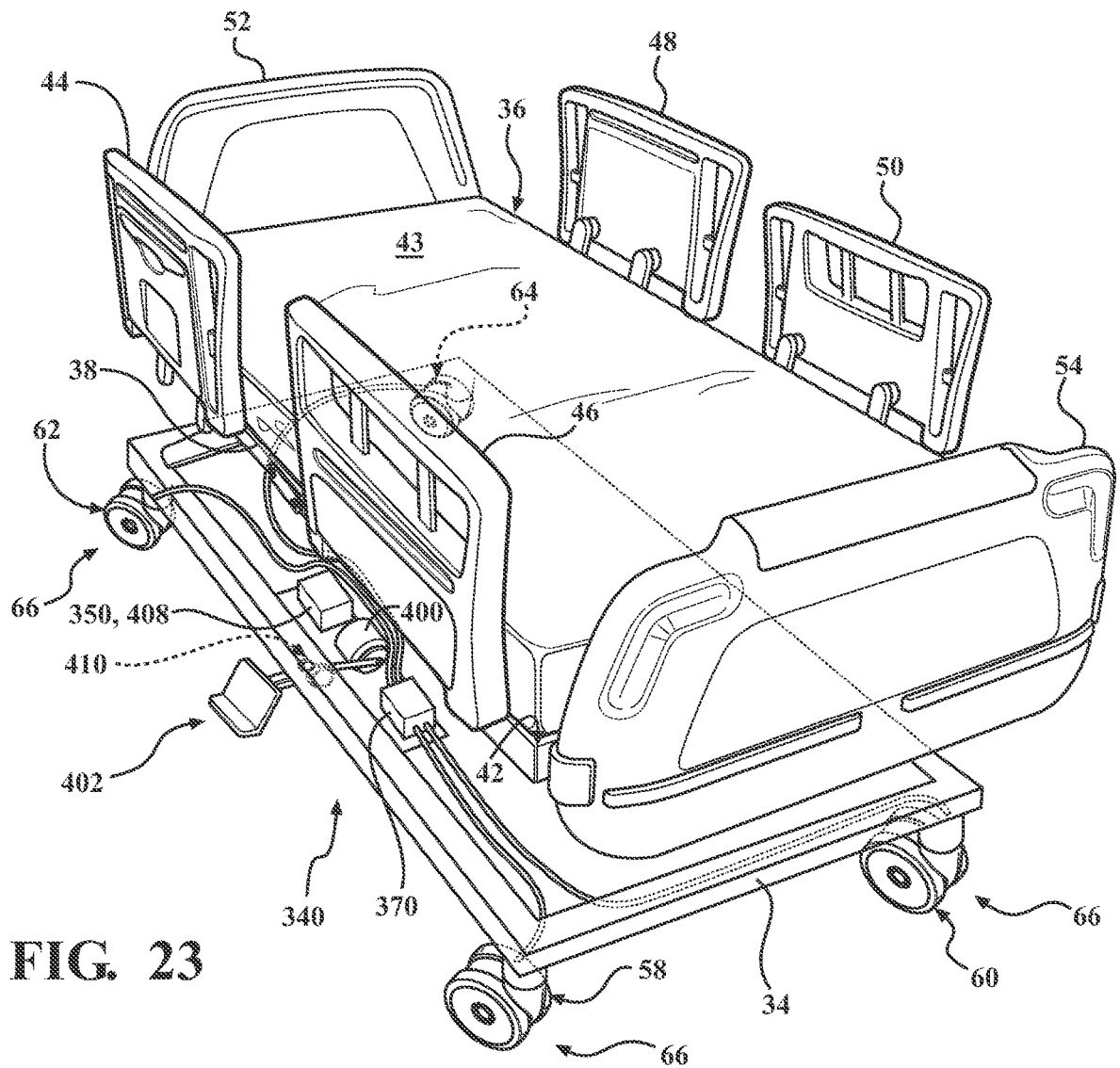
FIG. 23 is a schematic illustration of the patient transport apparatus with a generator for generating and supplying back-up electricity.
Figure 24:
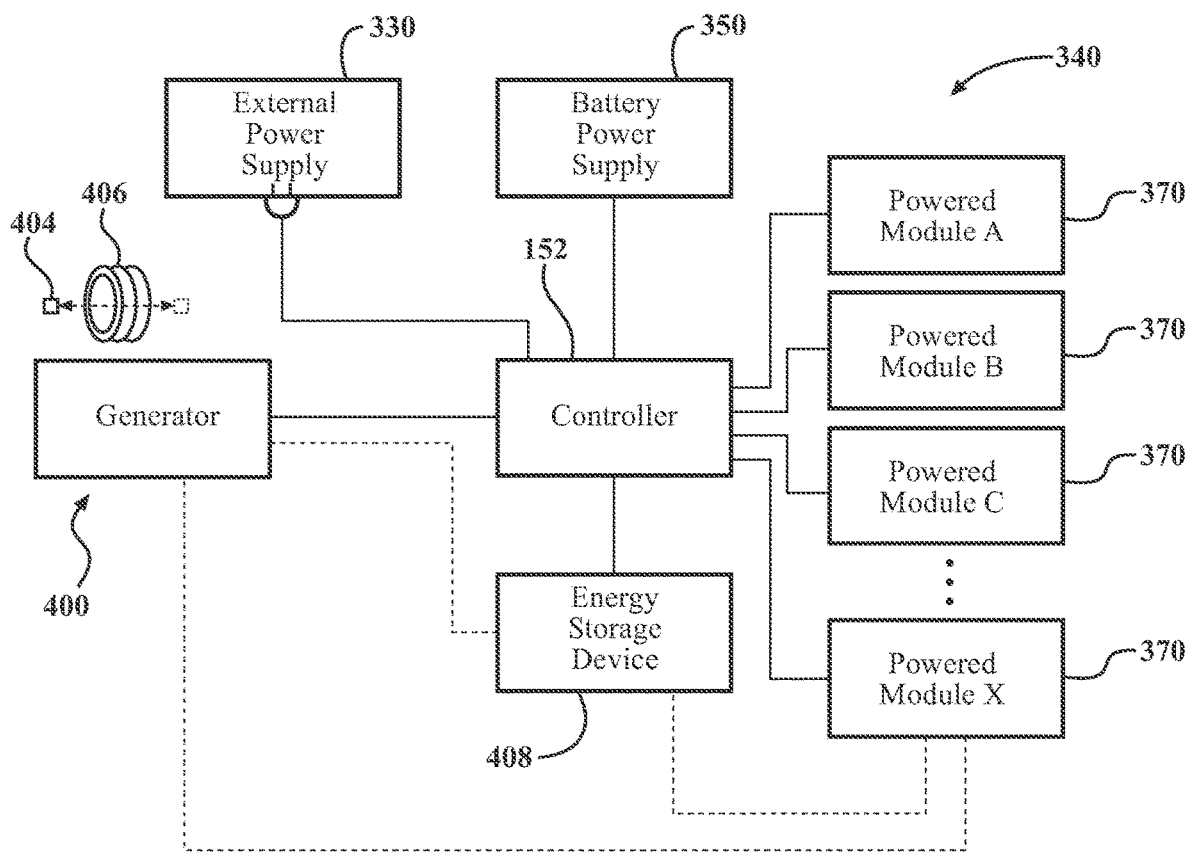
FIG. 24 is a schematic illustration of a power control system for the patient transport apparatus.

Referring to FIGS. 23 and 24, the patient transport apparatus 30 is configured with a power control system 340. The power control system 340 comprises a rechargeable battery power supply 350. The battery power supply 350 comprises one or more batteries. The battery power supply 350 can be recharged when coupled to the external power source 330. The battery power supply 350 is electrically coupled to one or more powered modules 370 when the patient transport apparatus 30 is disconnected from the external power source 330. However, the batteries can go dead in the field, leaving the powered modules on the patient transport apparatus 30 without power. For instance, the brake mechanisms 61, steer-lock mechanisms 63, and the pre-swivel mechanisms 65, if they utilize one or more electrical components or are electrically controlled, are unable to be operated in the event of complete power loss. For the caster assemblies 66 shown in FIGS. 3-7 this results in the brake mechanisms 61 being stuck in the braked mode. In other words, in certain configurations, the brake mechanisms 61 are unable to switch to the unbraked mode in the absence of a control signal from the controller 152. Further, in some cases, the patient transport apparatus 30 is free of manual brakes, i.e., the patient transport apparatus 30 is only equipped with electric brakes. It should be understood that manual brakes are brake mechanisms that require a user to manually actuate one or more brake pedals or other brake levers in order to switch between the braked and unbraked modes. When manual brakes are employed on the patient transport apparatus 30, along with electric brakes, the manual brakes can be operated under normal conditions instead of the electric brakes, based on operator preference.

Referring to FIGS. 23 and 24, a generator 400 is integrated into the power control system 340 to provide back-up electricity in the event of total power loss, such as a depleted or dead battery power supply 350, i.e., one that is unable to provide sufficient power for one or more of the powered modules 370 on the patient transport apparatus 30. The generator 400 is coupled to one or more of the powered modules 370 on the patient transport apparatus 30. This could be a direct connection (see dashed line in FIG. 24) or a connection through the controller 152 or through an energy storage device 408. The generator 400 is configured to generate and supply electricity to the powered modules 370. It may be determined that only one or two of the powered modules 370 require back-up electricity in the event of total power loss. Thus, the generator 400 may be directly connected to such modules only. The generator 400 may comprise an inductive power generator, a direct current power generator, an alternating current power generator, or combinations thereof.

The generator 400 comprises an actuator 402 configured to be manually engaged by the operator of the patient transport apparatus 30 to generate the electricity. In one embodiment, the actuator 402 comprises a foot pedal. Other manually actuated mechanisms are also contemplated that convert mechanical motion into electrical energy for immediate use or storage in a capacitor or battery. Other foot actuators and/or a hand actuator are possible. The actuator 402 may be mounted at various locations on the patient transport apparatus 30, and may also be temporarily removable to allow easier engagement by the operator.

In one embodiment, the actuator 402 is arranged so that a magnet 404 moves through a coil 406 to charge the energy storage device 408 when the actuator 402 is engaged. The magnet 404 is coupled to one of the actuator 402, the base 34, and the wheels 58, 60, 62, 64, and the coil is coupled to the other of the actuator 402, the base 34, and the wheels 58,

60, 62, 64. The magnet 404 and the coil 406 are configured to move relative to one another during engagement of the actuator 402.

The energy storage device 408 is electrically coupled to the generator 400 and stores electrical energy produced by the generator 400. The energy storage device 408 is electrically coupled to one or more of the powered modules 370 on the patient transport apparatus 30 either directly (see dashed line in FIG. 24) or through the controller 152. The energy storage device 408 comprises a capacitor or a battery. In some cases, the energy storage device 408 is the on-board battery power supply 350 of the patient transport apparatus 30. In other cases, a separate battery for back-up power storage is provided. Enough energy could be generated to power the brake mechanisms 61 to move them to the unbraked mode and allow the operator to continue moving the patient transport apparatus 30 so that the patient transport apparatus 30 can be connected to the external power source 330. Of course, various configurations of the battery and capacitor are contemplated. Thus, the battery may comprise any type of cell, such as a lithium cell battery. The capacitor may have a size suitable to store sufficient power to activate the one or more powered modules 370 for a predetermined amount of time.

In some embodiments, when the actuator 402 comprises the foot pedal, the foot pedal is pivotally coupled to the base 34 or one of the wheels 58, 60, 62, 64. The actuator 402 further comprises a gearing system 410 to provide mechanical advantage to the operator during engagement of the actuator 402. At least a portion of the mechanical energy applied to the actuator 402 by the operator is converted to electrical energy by the generator 400 to provide to the powered modules 370. In an alternative embodiment, the generator 400 comprises a solar power generator or other non-mechanical power generator. In this embodiment, the actuator 402 acts to close a circuit to connect the generator 400 directly to one or more powered modules 370, to the controller 152, or to the energy storage device 408.

The powered modules to receive back-up electricity provided by the generator 400 may comprise one or more of an electric brake, a patient positioning system, a scale, a lighting system, a DVT motor and pump assembly, a mattress motor and pump assembly, a steer-lock actuator, a pre-swivel actuator, or combinations thereof. The powered modules can be any powered device of the patient transport apparatus 30 that can be supported by the power created by the generator 400. The patient positioning system may comprise a patient lowering system or a deck adjustment system having one or more actuators for lifting and lowering the patient support surface 42 and/or adjusting one or more of the deck sections.

Figure 25:
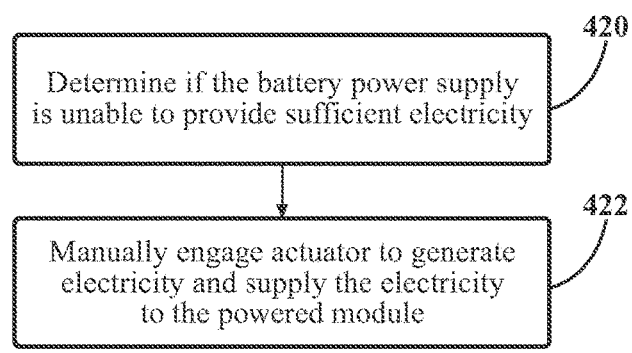
FIG. 25 is a flow diagram of steps for a method of providing the back-up electricity to a powered module of the patient transport apparatus.

FIG. 25 is a flow diagram of steps for a method of providing the back-up electricity to the powered module 370 of the patient transport apparatus 30. In step 420, the method comprises determining that the battery power supply 350 is unable to provide sufficient electricity to the powered module 370 for operation. The actuator 402 is then manually engaged by the operator, in step 422, to generate electricity and supply the electricity to the powered module 370 for operation. In some cases, only one actuation of the actuator 402 is needed to generate enough electricity for the intended purpose. In other cases, the actuator 402 may require several depressions or engagements to generate a suitable amount of electricity. In this instance, the actuator 402 may be configured to reset after each actuation, such as when the single foot pedal is used or the actuator may continuously move in a single direction, such as a rotary hand crank.

It should be appreciated that the term "lock" may refer to a positive lock in which swiveling or rolling of a wheel is prevented. However, "lock" may also mean preventing motion from exceeding a limited range of rolling or swiveling, such as between 0 and 15 degrees. Additionally, "lock" may mean constrained, such as constraining rolling or swiveling of the wheel, but under enough force, the wheel can be rolled or swiveled.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A caster assembly for use with a patient transport apparatus, said caster assembly comprising:
   a spindle comprising a shaft and a swivel axis;
   a wheel support coupled to said spindle;
   a wheel coupled to said wheel support to swivel about said swivel axis, said wheel comprising wheel grooves;
   a brake mechanism coupled to said wheel and operable between a braked mode and an unbraked mode, said brake mechanism comprising a locking pin biased into one of said wheel grooves in said braked mode;
   a swivel-lock assembly disposed within said wheel support and configured to lock swiveling of said wheel about said swivel axis in said braked mode, wherein said swivel-lock assembly comprises a first swivel-lock member fixed in relation to said wheel support to rotate with said wheel support and a second swivel-lock member slidably coupled to said shaft and fixed from rotating relative to said shaft, wherein said swivel-lock members are configured to be placed in a meshing relationship to lock swiveling of said wheel about said swivel axis; and
   wherein said brake mechanism comprises a brake actuator, a brake lever coupled to said locking pin, and a plunger, said brake actuator being controllable to move said plunger so that said plunger abuts and depresses said brake lever thereby moving said locking pin out of engagement with said wheel groove in said unbraked mode, said brake actuator also being controllable to move said plunger so that said second swivel-lock member is separated from said first swivel-lock member to allow said wheel to swivel in said unbraked mode.

2. The caster assembly of claim 1, wherein said brake actuator comprises a solenoid.

3. The caster assembly of claim 1, wherein said brake actuator comprises a motor.

4. The caster assembly of claim 1, wherein said brake actuator is controllable by a controller configured to transmit a control signal to said brake actuator to control movement of said plunger with said actuator.

5. The caster assembly of claim 1, further comprising a brake sensor configured to determine operation of said brake mechanism between said braked mode and said unbraked mode.

6. The caster assembly of claim 5, wherein said brake sensor comprises one or more mechanically actuated switches arranged for engagement with said plunger when said brake actuator moves said plunger.

7. The caster assembly of claim 5, wherein said brake sensor comprises one or more hall-effect sensors coupled to said brake actuator.

8. The caster assembly of claim 1, wherein said brake mechanism further comprises a pivot pin coupled to said wheel support, said pivot pin supporting said brake lever for pivoting movement relative to said wheel support as said brake actuator moves said plunger.

9. The caster assembly of claim 1, further comprising a linkage operatively attached to said locking pin and pivotably coupled to said brake lever.

10. The caster assembly of claim 9, wherein said brake mechanism further comprises a biasing device acting between said wheel support and said linkage to bias said locking pin into engagement with one of said wheel grooves in said braked mode.

11. The caster assembly of claim 10, wherein said biasing device comprises a compression spring.

12. The caster assembly of claim 1, further comprising a pre-swivel mechanism coupled to said wheel to swivel said wheel about said swivel axis, when said brake mechanism operates in said unbraked mode, from said a non-trailing orientation toward a trailing orientation relative to a direction of desired movement of the patient transport apparatus.

13. The caster assembly of claim 12, including a controller configured to detect said direction of desired movement based on an input signal received from an input device.

14. The caster assembly of claim 13, wherein said input device comprises a force sensing system configured to detect a force applied by an operator to the patient transport apparatus to determine said direction of desired movement.

15. The caster assembly of claim 13, further comprising a brake coupled to said wheel and operable in a braked mode and an unbraked mode, wherein said controller is configured to determine when said brake is in said braked mode, and said controller is configured to prevent actuation of said pre-swivel mechanism if said controller determines that said brake is in said braked mode.

16. The caster assembly of claim 13, wherein said controller is configured to detect whether said wheel is in said trailing orientation or said non-trailing orientation.

17. The caster assembly of claim 16, further comprising a position sensor in communication with said controller and configured to detect whether said wheel is in said trailing orientation or said non-trailing orientation.

18. The caster assembly of claim 13, wherein said controller is configured to actuate said pre-swivel mechanism after a predetermined amount of time after receiving said input signal from said input device.

19. The caster assembly of claim 12, wherein said pre-swivel mechanism comprises a motor coupled to said wheel.

20. The caster assembly of claim 12, wherein said pre-swivel mechanism is configured to swivel said wheel at least 180 degrees between said non-trailing orientation and said trailing orientation.

* * * * *